US007681086B2

(12) United States Patent
Vlassova et al.

(10) Patent No.: US 7,681,086 B2
(45) Date of Patent: Mar. 16, 2010

(54) FAULT TREE MAP GENERATION

(75) Inventors: Olga Alexandrovna Vlassova, S.J. Dos Campos (BR); Antonio Bakowski, S.J. Dos Campos (BR); Jaures Cardoso, Jr., S.J. Dos Campos (BR); Aldo Martinazzo, S.J. Dos Campos (BR)

(73) Assignee: Embraer- Empresa Brasileira de Aeronautica S.A., San Jose Dos Campos - SP (BR)

( * ) Notice: Subject to any disclaimer, the term of this patent is extended or adjusted under 35 U.S.C. 154(b) by 348 days.

(21) Appl. No.: 11/858,146

(22) Filed: Sep. 20, 2007

(65) Prior Publication Data

US 2009/0083576 A1 Mar. 26, 2009

(51) Int. Cl.
*G06F 11/00* (2006.01)
(52) U.S. Cl. ............................ 714/46; 700/177; 715/273
(58) Field of Classification Search ....................... None
See application file for complete search history.

(56) References Cited

U.S. PATENT DOCUMENTS

| 4,849,900 | A | | 7/1989 | Blight et al. |
| 4,870,575 | A | | 9/1989 | Rutenberg |
| 5,369,756 | A | | 11/1994 | Imura et al. |
| 5,561,762 | A | * | 10/1996 | Smith et al. ................ 714/33 |
| 5,699,403 | A | * | 12/1997 | Ronnen ................ 379/15.04 |
| 5,722,620 | A | | 3/1998 | Najmabadi et al. |
| 6,125,453 | A | * | 9/2000 | Wyss .............................. 714/1 |
| 6,820,044 | B2 | | 11/2004 | Groen et al. |
| 7,013,411 | B2 | | 3/2006 | Kallela et al. |
| 7,017,080 | B1 | | 3/2006 | Liggesmeyer et al. |
| 7,200,525 | B1 | * | 4/2007 | Williams et al. ............ 702/185 |

(Continued)

FOREIGN PATENT DOCUMENTS

JP  5-143570  6/1993

(Continued)

OTHER PUBLICATIONS

Isograph, "Fault Tree Analysis Software", Publication date: 2005.*

(Continued)

*Primary Examiner*—Gabriel L Chu
(74) *Attorney, Agent, or Firm*—Nixon & Vanderhye PC

(57) ABSTRACT

A method for Fault Tree Map generation employs to transformation of Fault Trees of production installation, specific installation, technical system (Hardware and integrated Hardware/Software) to new Fault Tree diagram (Fault Tree Map), which permits drastically compact the Fault Tree depiction and facilitates performing of the Fault Tree qualitative analysis, including evaluation of combination of latent failures and evident failures, repeated events and critical events position influence, and failure propagation potentiality, besides facility of localization of each Fault Tree logical Gate and relevant failures in the fault tree printed report. Generation takes place using special symbols, which permit to reflect the Fault Tree logic, present all Fault Tree failures with graphically identification of the failure type, and show the failure repetition and also the failure critically (importance) to Fault Tree Top Event probability. The method presents exceptional advantages to analysis of large-scale, extended Fault Trees, allowing vastly decrease the time of analysis and elevate the analysis quality and Fault Tree perception, including for specialists, who are not the Fault Tree authors.

20 Claims, 39 Drawing Sheets

U.S. PATENT DOCUMENTS

| | | | |
|---|---|---|---|
| 7,526,391 | B2* | 4/2009 | Bickel .......................... 702/57 |
| 2002/0066829 | A1 | 6/2002 | DeWitt et al. |
| 2004/0143561 | A1 | 7/2004 | Jensen et al. |
| 2009/0083014 | A1* | 3/2009 | Schallert ........................ 703/6 |
| 2009/0106593 | A1* | 4/2009 | Bluvband et al. ............. 714/37 |

FOREIGN PATENT DOCUMENTS

| | | |
|---|---|---|
| JP | 2000-194561 | 7/2000 |

OTHER PUBLICATIONS

Vemuri, K.K. et al., "A Design Language for Automatic Synthesis of Fault Trees," Proceedings Annual Reliability and Maintainability Symposium, pp. 91-96 (1999).

Wang, J.D. "A Component Behavioural Model For Automatic Fault-Tree Construction", Reliability Engineering & System Safety UK, vol. 42, No. 1, pp. 87-100 (1993).

Brown, Kevin. "Evaluating Fault Trees (and & or Gates Only) with Repeated Events", IEEE Transactions on Reliability, vol. 39, No. 2, pp. 226-235 (1990).

Sinnamon, Roslyn, Andrews, John., "Fault Tree Analysis and Binary Decision Diagrams", 1996 Proceeding Annual Reliability and Maintainability Symposium, pp. 215-222 (1996).

Henry, J.J., Andrews, J.D. "Computerized Fault Tree Construction For A Train Braking System", Quality and Reliability Engineering International, vol. 13 No. 5 pp. 299-309 (1997).

Papazoglou, Ioannis A., "Functional Block Diagrams and Automated Construction of Event Trees", Reliability Engineering and Systems Safety, vol. 61, pp. 185-214 (1998).

Swaminathan, S., Smidts, C., "The Event Sequence Diagram Framework For Dynamic Probabilistic Risk Assessment", Reliability Engineering and Systems Safety, vol. 63 pp. 73-79 (1999).

Sun, H., Andrews, J.D., "Identification of Independent Modules in Fault Trees which contain Dependent Basic Events", Reliability Engineering and Systems Safety, vol. 86, pp. 285-296 (2004).

Remenyte, R., Andrews, J.D., "A Simple Component Connection Approach for Fault Tree Conversion to Binary Decision Diagram", IEEE Computer Society, Proceedings of the First Conference on Availability, Reliability and Security (ARES '06) (Sep. 2006).

Kaiser, Bernhard et al., "A New Component Concept for Fault Trees," 8$^{th}$ Australian Workshop on Safety Critical Systems and Software (SCS'03), Canberra (2003).

Assaf, Tariq et al., "Diagnostic Expert Systems from Dynamic Fault Trees," University of Virginia, Charlottesville, 2004RM-060: pp. 1-6 (2004).

Sullivan, Kevin J. et al., "The Galileo Fault Tree Analysis Tool," University of Virginia, Charlottesville (2003).

Tang, Zhihua et al., University of Virginia, Charlottesville, "Minimal Cut Set/Sequence Generation for Dynamic Fault Trees" (Jan. 2004).

Tang, Zhihua et al., University of Virginia, Charlottesville, "An Integrated Method for Incorporating Common Cause Failures in System Analysis" (Jan. 2004).

Scott, Jeff, Aerospace.org, "Ask Us—Angle of Attack and Pitch Angle," 6 pages (Feb. 29, 2004).

Goodrich Sensor Systems, Angle of Attack Systems, Goodrich Corporation, Burnsville, MN (Mar. 2002).

"How to choose an Attitude Sensor, Application Notes on Watson's Inertial Sensors," Watson Industries Ltd., Romsey, Hampshire, 8 pages.

Coppit, David et al., "Formal Semantics of Models for Computational Engineering: A Case Study on Dynamic Fault Trees," Proceedings of the International Symposium on Software Reliability Engineering, pp. 270-282, San Jose, California (Oct. 8-11, 2000).

Coppit, David et al., "Multiple mass-market applications as components," In Proceedings of the 22nd International Conference on Software Engineering, pp. 273-282, Limerick, Ireland (Jun. 4-11, 2000).

Bechta, Joanne et al., "Developing a low-cost, high-quality software tool for dynamic fault tree analysis," Transactions on Reliability, pp. 49-59 (Dec. 1999).

Bechta, Joanne et al., "Developing a high-quality software tool for fault tree analysis," In Proceedings of the International Symposium on Software Reliability Engineering, pp. 222-231, Boca Raton, Florida (Nov. 1-4, 1999).

Sullivan, Kevin et al., "The Galileo fault tree analysis tool," In Proceedings of the 29th Annual International Symposium on Fault-Tolerant Computing, pp. 232-235, Madison, Wisconsin (Jun. 15-18, 1999).

Coppit, David et al., "Formal specification in collaborative design of critical software tools," In Proceedings Third IEEE International High-Assurance Systems Engineering Symposium, pp. 13-20, Washington, D.C. (Nov. 13-14, 1998).

Tariq Assaf and Joanne Bechta Dugan "Diagnostic Expert Systems from Dynamic Fault Trees," In Annual Reliability and Maintainability Symposium 2004 Proceedings, LA (Jan. 2004).

Zhihua Tang and Joanne Bechta Dugan, "Minimal Cut Set/Sequence Generation for Dynamic fault Trees," In Annual Reliability and Maintainability Symposium 2004 Proceedings, LA (Jan. 2004).

Zhihua Tang and Joanne Bechta Dugan, "An Integrated Method for Incorporating Common Cause Failures in System Analysis," In Annual Reliability and Maintainability Symposium 2004 Proceedings, LA (Jan. 2004).

Hong Xu and Joanne Bechta Dugan, "Combining Dynamic Fault Trees and Event Trees for Probabilistic Risk Assessment," In Annual Reliability and Maintainability Symposium 2004 Proceedings, LA (Jan. 2004).

Tariq Assaf and Joanne Bechta Dugan, "Automatic generation of Diagnostic Expert Systems from Fault Trees," In Annual Reliability and Maintainability Symposium 2003 Proceedings, Tampa, FL (Jan. 2003).

Yong Ou and Joanne Bechta Dugan, "Sensitivity Analysis of Modular Dynamic Fault Trees," IEEE International Computer Performance and Dependability Symposium (Mar. 2000).

Leila Meshkat, Joanne Bechta Dugan, and John D. Andrews, "Analysis of safety systems with on-demand and dynamic failure modes," University of Virginia, Charlottesville, 2000RM-115: p. 1-9 (2000).

Ragavan Manian, David W. Coppit, Kevin J. Sullivan, and Joanne Bechta Dugan., "Bridging the gap between systems and dynamic fault tree models," In Annual Reliability and Maintainability Symposium 1999 Proceedings, pp. 105-111, Washington, DC, USA (Jan. 18-21, 1999).

Ragavan Manian, Joanne Bechta Dugan, David Coppit, and Kevin Sullivan, "Combining various solution techniques for dynamic fault tree analysis of computer systems," In Proceedings Third IEEE International High-Assurance Systems Engineering Symposium, pp. 21-28, Washington, D.C. (Nov. 13-14, 1998).

Joanne Bechta Dugan and Tariq S. Assaf, "Dynamic Fault Tree Analysis of a Reconfigurable Software System," The 19th International System Safety Conference, Huntsville, Alabama (Sep. 2001).

Joanne Bechta Dugan, Bharath Venkataraman, and Rohit Gulati. DIFTree: A software package for the analysis of dynamic fault tree models., In Annual Reliability and Maintainability Symposium 1997 Proceedings, Philadelphia, PA (Jan. 13-16, 1997).

Systems and Reliability Research Office of Nuclear Regulatory Research, U.S. Nuclear Regulatory Commission, NUREG-0492, Fault Tree Handbook, Washington D.C. (Jan. 1981).

SAE, The Engineering Society for Advancing Mobility Land Sea Air and Space International, Aerospace Recommended Practice, "Guidelines and Methods for Conducting the Safety Assessment Process on Civil Airborne Systems and Equipment," ARP4761 (Dec. 1996).

* cited by examiner

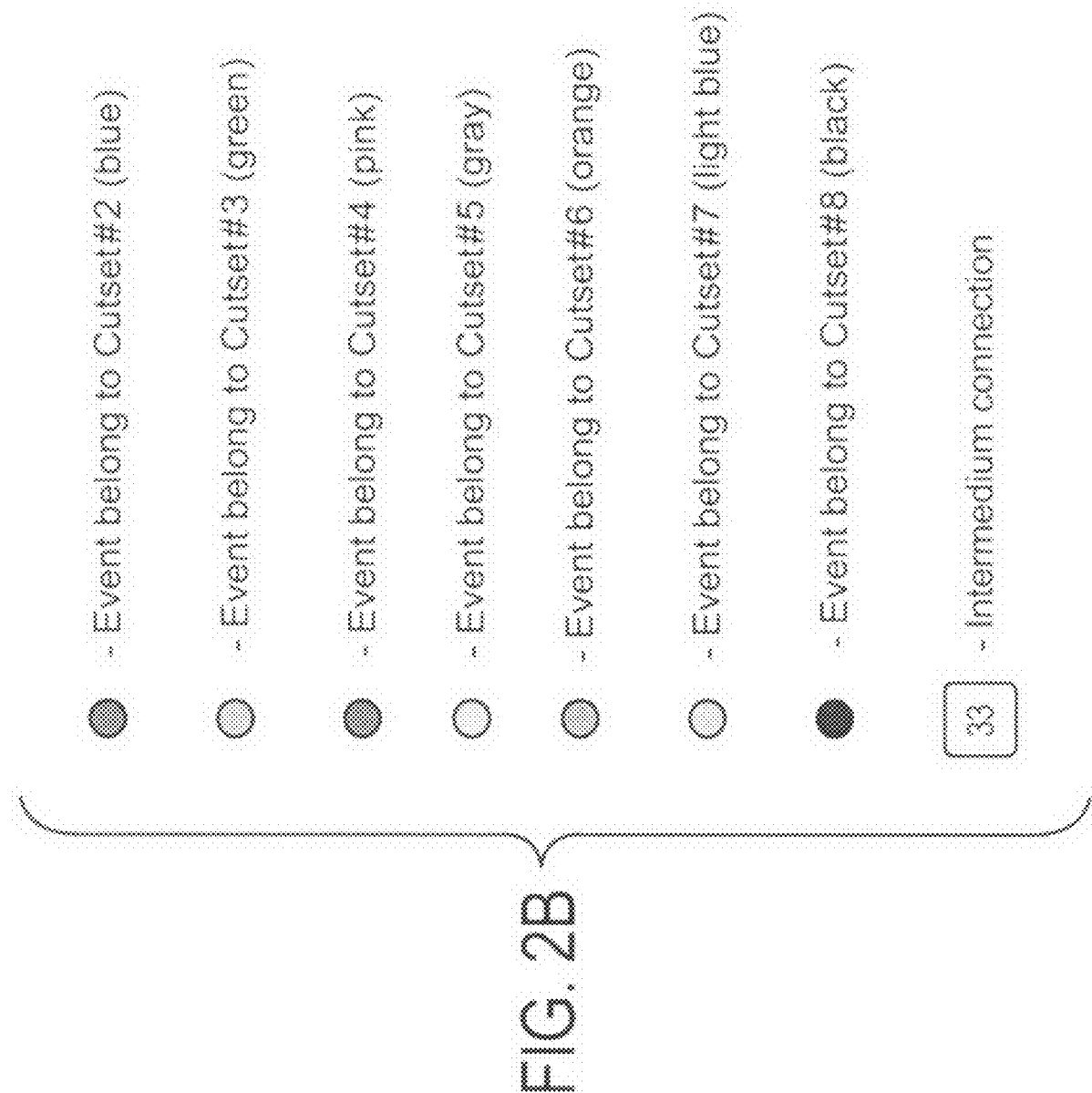

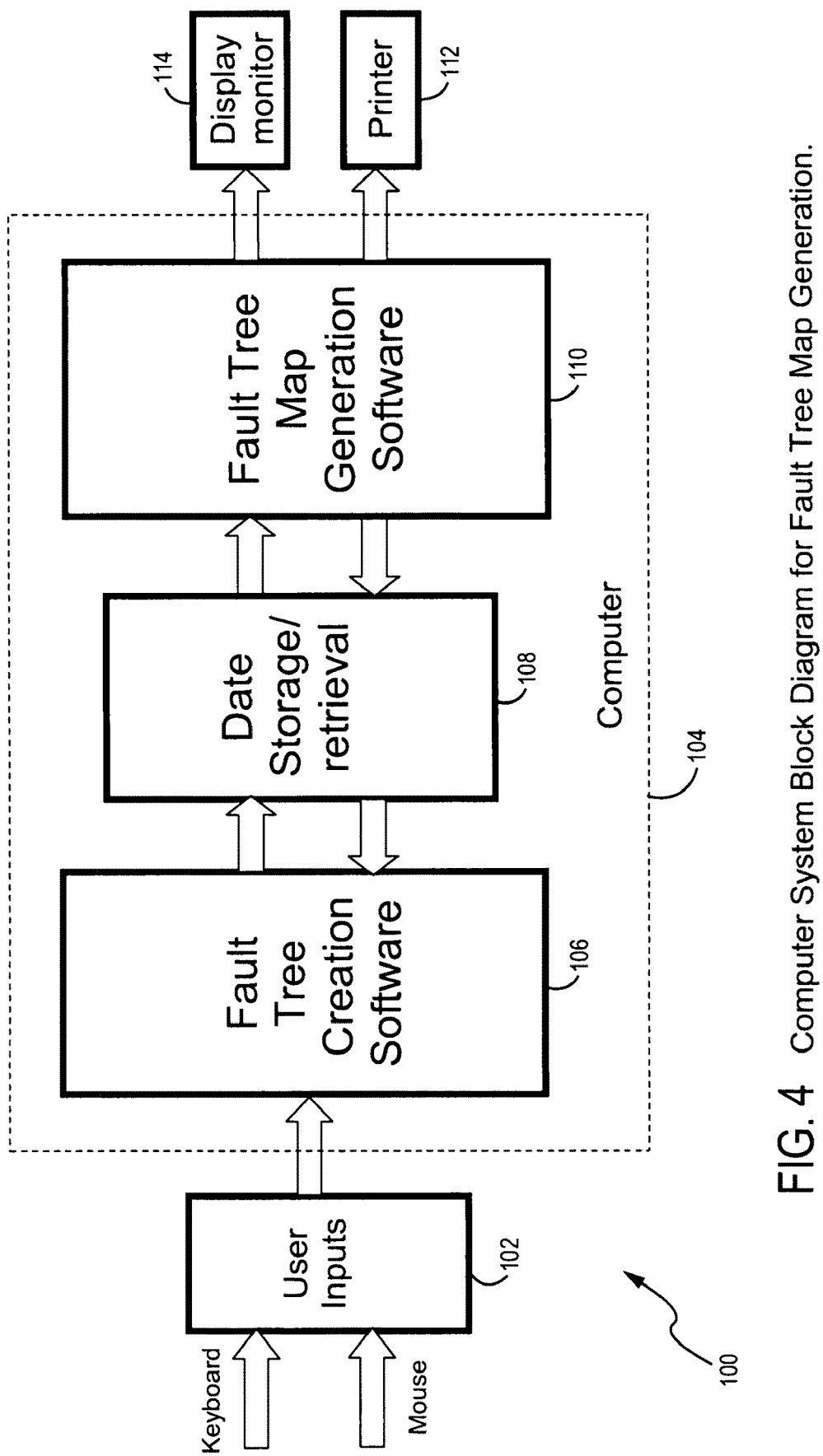
FIG. 4  Computer System Block Diagram for Fault Tree Map Generation.

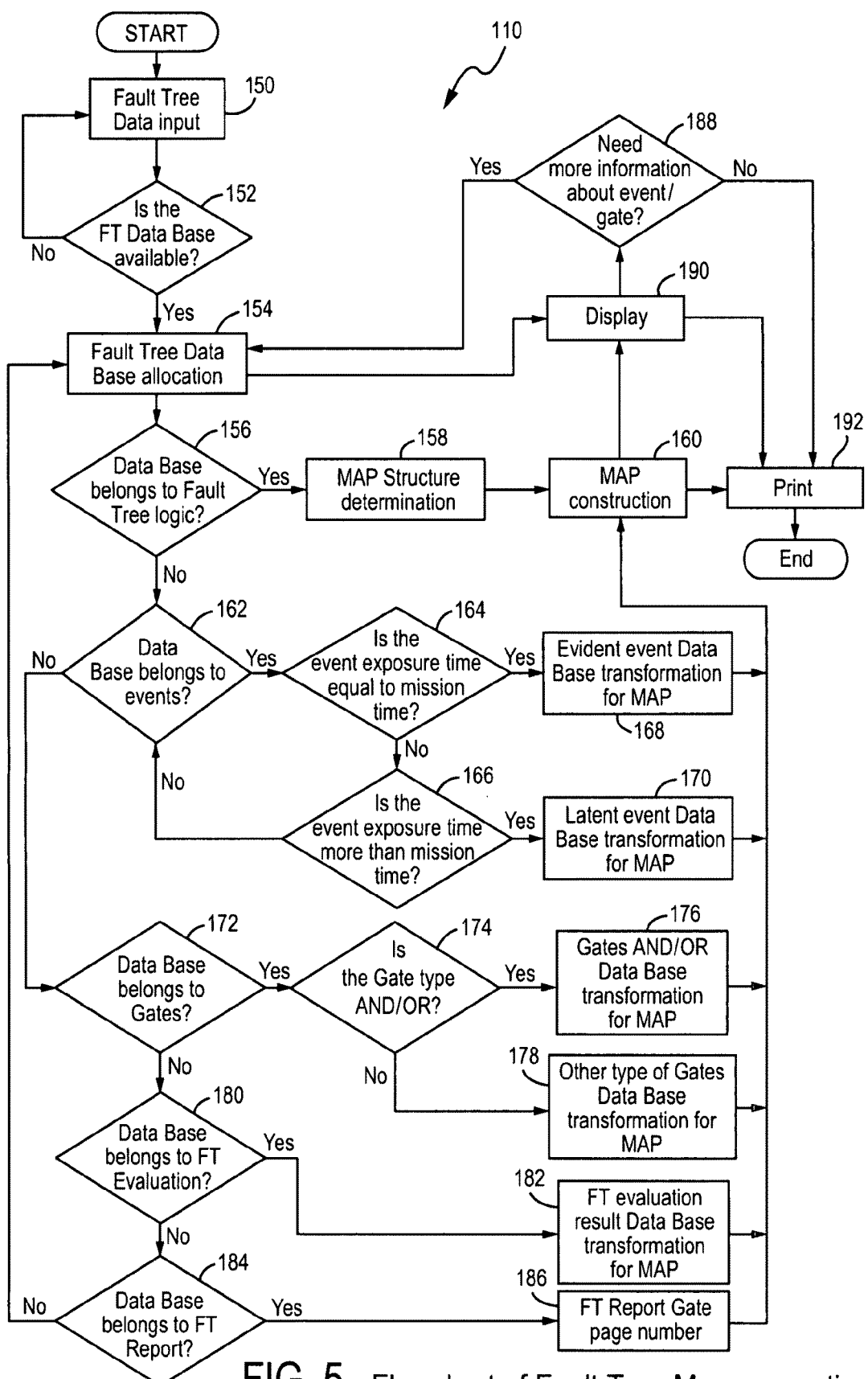
FIG. 5  Flowchart of Fault Tree Map generation.

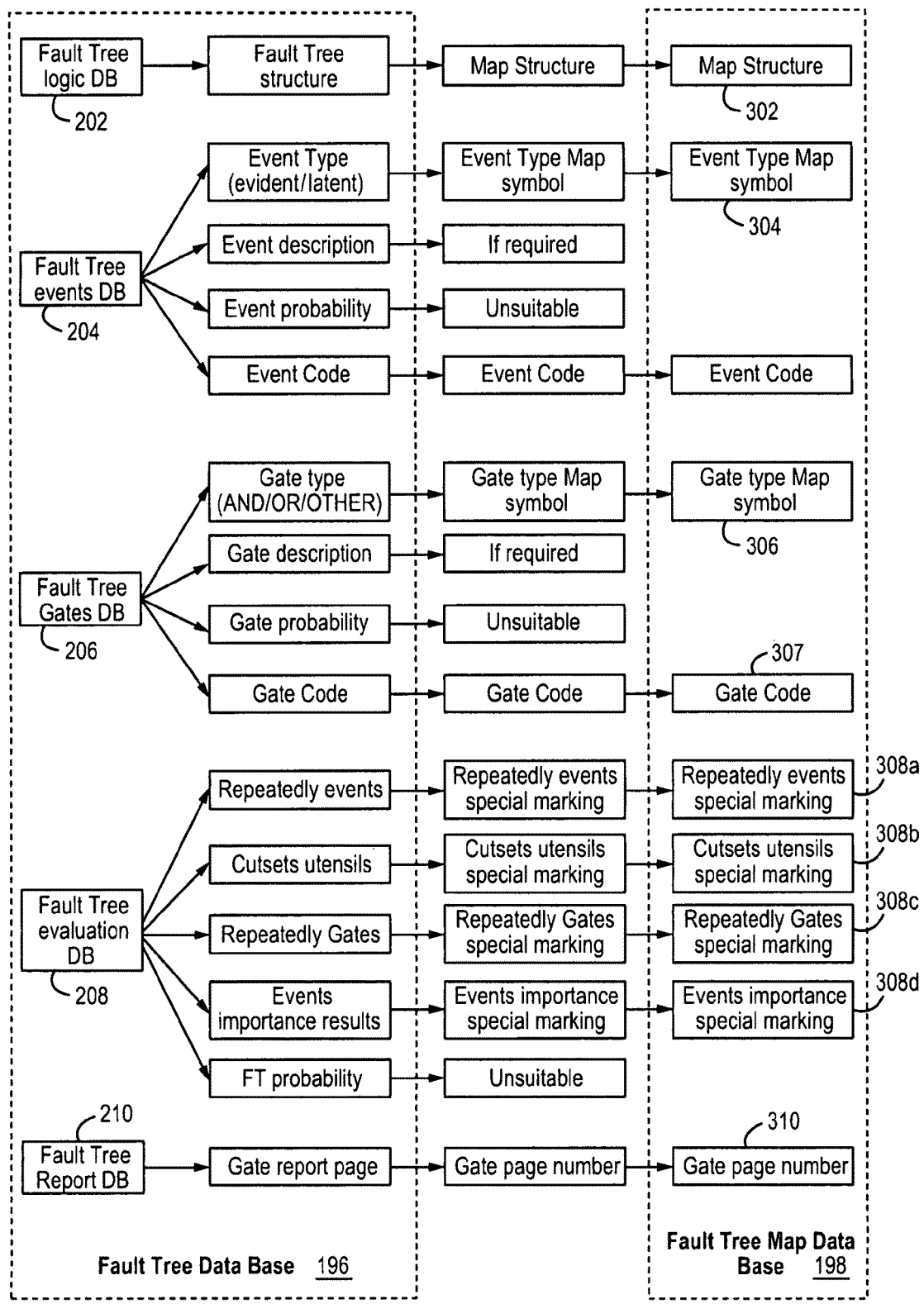
FIG. 6  Data Base Transformation Diagram.

FAULT TREE MAP GENERATION

FIELD

The technology herein relates to fault tree analysis, and more particularly to methods and apparatus for transforming a fault tree into a compact fault tree map. Still more particularly, the technology herein relates to Fault Tree Map generation through use of special symbols and graphical presentation in order to facilitate fault tree qualitative analysis. The technology herein can generally be adapted for use with any type of the Fault Tree, including Fault Trees developed for production installation, specific installation, hardware and integrated hardware/software technical systems. The technology herein is suitable, for example, for use in performing systems, installations and equipment faults analysis, including fault propagation, for complex or other integrated objects, systems or installations including but not limited to aircraft failure analysis.

BACKGROUND AND SUMMARY

No man-made machine or system can be designed to be 100% reliable. Any machine or system we can design and build will eventually break down and fail. In many cases, a breakdown can be handled simply by repairing or replacing a defective system or part. For example, when a light bulb burns out, you simply replace it with a new bulb. If a household appliance such as a dishwasher or oven in your kitchen breaks down, you may be inconvenienced until the appliance can be repaired but few other adverse consequences generally occur. However, as we trust and rely on technology more and more, there is an increased risk that technology failure can have catastrophic consequences.

Consider, for example, what would happen if the braking system in your car failed just when you needed to stop suddenly to avoid an oncoming car. Imagine the consequences if a heart-lung machine were to fail during an operation, or if an aircraft propulsion system were to fail in mid-flight. Picture what would happen if the power grid of a major metropolitan city were to cease operating during a heat wave, or if a city's emergency responder communications system were to fail during a large-scale emergency. Imagine the disaster that would occur if a nuclear reactor were to fail, such as at Chernoble, in a catastrophic manner that released radiation into the surrounding area.

To prevent single point failures from having catastrophic consequences, system designers often build in redundancy and fault protection. Such "fault-tolerant" systems are designed so that if one important component or function fails, another part of the system stands ready to take its place or at least provide sufficient functionality to continue safe operation. For example, an aircraft or spacecraft may be designed to have a main power system plus a backup power system. If the main power system fails, the backup power system immediately takes over. Similarly, aircraft are usually provided with redundant instrumentation so that even if certain instrumentation fails, the pilot still has the information she needs to continue to fly the plane safely.

While such fault tolerant designs have been highly successful, they introduce additional complexity to the already complex problem of reliably predicting how the system will operate in the event of certain faults. Fault testing is certainly a useful way of predicting system behavior, but there is generally a need for tools that help system designers predict system fault behavior without subjecting the system being analyzed to potentially destructive exhaustive fault testing.

Fault analysis using Fault Trees is a common method known and widely used in various industries and developments to evaluate object efficiency and safety. Generally speaking, a fault tree is a logical construct that attempts to represent system operational and fault states with nodes and paths that in some sense resemble the root, trunk, branches and leaves of a tree. The paths to the nodes are typically defined using Boolean logic which precisely describes logical combinations of nodes and paths. Such fault tree representations allow system and reliability engineers to visualize and analyze system failure modes so they can predict how certain types of faults will affect system operation. Using such fault tree analysis, it is possible, for example, to predict co-dependencies between faults and to isolate which faults that could potentially cause mission-critical systems and subsystems to catastrophically fail. Fault trees also give system designers a better idea concerning overall system reliability and behavioral complexity and can help designers simplify their systems to achieve higher reliability with reduced cost and greater efficiency.

Various computerized tools have been developed to construct and calculate Fault trees by e.g., inputting Fault Tree logic (using logical Gates, accordingly to e.g., NUREG-0492, Fault Tree Handbook) and fault Date Bases (e.g., logging or otherwise recording failure rate and exposure time, or failure probability).

Generally speaking, there are two types of Fault Tree (failure combinations) analyses: quantitative and qualitative. A quantitative analysis is generally linked with Fault Tree Top Event probability calculation. A qualitative analysis generally envisages the evaluation of Fault Tree structure, Fault Tree Cut Sets, combinations of evident and latent failures, possible failure propagation, and the like. Each type of analysis can be useful and powerful.

Much work has been done in the area of Fault Tree techniques, Fault Trees generation and analysis. Some, for example, have developed methods for the automated generation of an extended Fault Trees, adapted to a production installation or a specific installation. Others have developed methods for technical system fault tree determining with extended fault description. Still others have proposed system integrated fault tree analysis methods. Some have declared fault tree displaying method for system diagnosis.

Many prior approaches, if implemented to construct fault trees for complex integrated systems/installations (for example, in the aeronautic industry) will result in extended large fault trees, that can consist about 200-300 failure nodes. Such fault trees if printed out in a graphical format could result for example in hundreds of printed pages considering the practices recommended by NUREG-0492, Fault Tree Handbook, and the Aerospace Industry (see specification ARP4761). Such graphical representation provides a complex set of fault event and logical gate images and also takes stock of relevant information presented on the fault tree for fault tree Top event probability calculation. Unfortunately, such complex fault tree graphical representations are, because they are so large, not possible or practical to display on a single display screen or page view. Rather, systems analysts must generally print out the fault tree and conduct analyses than can span over many tens or even hundreds pages of graphical representation. The complexity of such graphical representations can be overwhelming.

Hence, existing computerized tools to perform fault tree creation generally can show large and complex fault trees on a computer screen only one part at a time. Furthermore, a printed report also generally presents the fault tree page by page. The amount of time and complexity required to analyze such multi-view representations can be substantial. For example, consider a person who is not author of this fault tree, but who needs to understand the fault tree logic (e.g., to evaluate the fault tree accuracy, to merge various fault trees on the systems integrated level, etc.) and perform the fault tree analysis. The task such a person faces can be difficult, and can obviously involve considerable time outlay.

It is possible to make the following observations or definitions concerning fault tree terminology:

Evident failure—a failure which is detected and/or annunciated when it occurs.

Latent failure—a failure which is not detected and/or annunciated when it occurs. A failure is latent until it is made known by special test/proceeding.

Repeated failure—a failure that appears more than once in the given Fault Tree.

Fault Tree Cut Set—smallest set of failures which must occur in order for the Fault Tree Top Event to occur.

System designers and reliability engineers strive to design systems so that no single point of failure than completely comprise system functionality. Therefore, those skilled in the art understand that a particular failure which is repeated multiple times in a fault tree can be especially significant. The multiple repetitions mean that this particular failure can contribute to multiple failure modes. As it is known (see Aerospace Recommended practice specification ARP4761 and other sources), repeated failures can vastly impact Fault Tree Top event probability and Fault Tree structure, primarily because they introduce potential lack of independence between Fault Tree elements (failures). To provide more detailed analysis in this case, the Fault Tree is generally handled correctly by the application of Boolean algebra to generate what are referred to above as "Cut Sets." After implementing in Boolean algebra, the Fault Tree structure may then be subject to alteration. Therefore, to avoid mistakes, knowledge about repeated event locations within the Fault Tree can be very important and useful.

Some known tools support performing Fault Tree analysis (assessment) by Cut Set generation and failure importance determination. Such support in some cases includes failure table generation. However, using such approaches, it is often difficult to apprehend why determined failures have entered in the cut sets, where in the fault tree the repeated failures are located, and how their positions influence fault tree Top event probability.

While much work has been done in the past, further improvements are possible and desirable.

The technology herein provides a Fault Tree map generation method that transforms a conventional fault tree to new type of fault tree diagram ("Fault Tree Map"), which permits drastically compact fault tree depiction and representation through special techniques.

Exemplary illustrative non-limiting techniques for generating fault tree maps graphically present fault trees in a compact, understandable, efficient manner from which repeated event location and other information can be readily ascertained. Exemplary illustrative non-limiting fault tree map generation provides a fault tree map that graphically presents fault tree failures with graphical identification of failure type and shows failure/gates repetition, cut set consistency and failure propagation potentiality, besides facility of localization of each Fault Tree logical Gate and relevant failures in the Fault Tree printed report.

In a non-limiting illustrative example fault tree map, markings are used to indicate repeated events to readily indicate the location of repeated failure on the fault tree. For example, repeated events are can be indicated by colored trapezoids; bolded (red) triangles indicate "top" events; and bolded (violet) circles indicate repeated gates. In addition, arrow connectors indicate events with exposure time in excess of flight duration. Different cutsets can be indicated by differently colored solid circles. AND logical connectors can be indicated by one symbol (e.g., triangle) and OR logical connectors can be indicated by a different symbol (circle), such symbols being different from the conventional AND and OR gate symbols that are typically used. Word descriptions are generally omitted in the exemplary illustrative non-limiting implementation.

In more detail, an exemplary illustrative non-limiting implementation provides the following exemplary steps using a conventional fault tree as a starting point:

Substitution of the all logical Gates by adequate symbols, which graphically define the Gate type and content the Gate identification Code;

Exclusion of the Gate description;

When on the report generation stage, inclusion of the numbers of pages, where the logical Gate is placed;

Substitution of evident failures by adequate symbols, which graphically define the failure type;

Substitution of all latent failures by adequate symbols (different than evident failure symbols), which graphically define the failure type;

Substitution of other types of failures by adequate different symbols, which graphically define the failure types;

Exclusion of all evident/latent/other failures description;

Using special or distinctive markings for repeated gates;

Using special or distinctive markings for repeated failures;

Using special or distinctive markings for failures of the same Cut Set;

Using special or distinctive markings for indicating failure importance evaluation results.

As a result of such exemplary illustrative non-limiting Fault Tree transformation, a resulting exemplary illustrative non-limiting Fault Tree Map reflects the Fault Tree logic, presents all Fault Tree failures with graphically identification of the failure type, and shows failure/Gates repetition, Cut Sets consistency and also failure criticality (importance) to Fault Tree Top Event probability.

One exemplary illustrative non-limiting Fault Tree Map image contains all information necessary to Fault Tree qualitative analysis, and allows one to comprehend at a glance (e.g., on a single printed page A4 or display screen view) a complex Fault Tree that for example may include 100-120 failure nodes (corresponding e.g., to 40-50 printed pages A4, as it is presented by existing computerized tools for Fault Tree creation).

Using this exemplary illustrative non-limiting compact Fault Tree depiction provided by the technology herein, any specialist, including one who is not the Fault Tree author, can rapidly understand the Fault Tree logic and conduct an appropriate failure analysis.

Considering the graphically defined failures type (latent or evident) that is clearly visible on the exemplary illustrative non-limiting Fault Tree Map provided by the technology herein, including its combination across the Fault Tree structure, analysis of the failures combinations that lead to a so-called Fault Tree Top Event (for example, a combination of one evident failure and one latent failure, or one evident and two latent failures, which are important to perform Safety Assessment and may depend on the failure combination hazard classification) can be performed to perceive what part of the System any failure belongs to and how far, within the fault tree, from the Fault Tree Top Event the failure is located.

In one exemplary illustrative non-limiting implementation, analysis of combinations of logical Gates through Fault Tree structure, that can be performed quickly and without hash due to possibility to discern entire Fault Tree on a single page, allows a reliability engineer to make conclusion about potentiality failure propagation (OR'ed combination of failure support the failure propagation, AND'ed combination of failures prevent the failure propagation) and also determine elements of the system that provide mitigation factor functionality.

Considering the high impact of repeated failures to Fault Tree Top event probability and Fault Tree structure, an exemplary illustrative non-limiting Fault Tree Map, that has opportunity to show, using special marking, various sets of repeated events, provides easy comprehension about the location of the repeated failures on the Fault Tree to provide adequate and efficient Fault Tree treatment.

In one exemplary illustrative non-limiting implementation, it is easy to perform failure Qualitative Importance Determination using a Fault Tree Map where failures that belong to each Cut Set were marked. This exemplary illustrative analysis can be performed to comprehend what part of the System the failure belongs to or is associated with, and how far from the Fault Tree Top Event the failure is located. The exemplary illustrative non-limiting implementation fault tree map also makes evident failures which appear more times in the Cut Sets and are located near to Fault Tree Top Events, thereby giving them enlarged importance to the Fault Tree.

Several computerized tools designed for Fault Tree treatment, perform quantitative failure Importance Evaluation. The exemplary illustrative non-limiting Fault Tree Map provided by the technology herein, which marks results of said Importance Analysis, allows one to understand why particular failures are important for the Fault Tree (for example, failures that provide input to OR'ed Boolean logic combinations are generally more critical or important than those failures that provide input to AND'ed combinations), and to provide, if necessary, adequate mitigation means to decrease the failure importance.

Thus the Fault Tree Map according to this exemplary illustrative non-limiting implementation is easy to understand, convenient to use and provide high analysis efficiency together with considerable time economy.

If desired, during analysis of the Fault Tree Map, some additional information about failure or logical Gates, in the form of data may be obtained from conventional Fault Tree, may be provided and represented on the Fault Tree Map using failure (or Gate) identification Code.

The exemplary illustrative Fault Tree Map may be analyzed by itself, or it may be used as a map or guide for analyzing the underlying more detailed and complex fault tree—thus serving as a map the same way that a roadmap helps one to navigate the complexity of city streets. For example, occasionally, at the report generation stage, a Fault Tree may need to be divided and paged. In the exemplary illustrative non-limiting implementation at this stage, the logical gates on the Fault Tree Map may be completed or identified by report page number, where each logical Gate is placed. This action provides highly efficient guidance for using the exemplary illustrative Fault Tree Map to guide the reliability engineer to traverse and analyze the conventional Fault Tree, to perform any type of failure analysis desired. For large-scale Fault Trees, this type of guidance allows one to appreciably decrease of the time outlay and avoid hash and mistakes during Fault Tree evaluation, including Fault Trees merging on the systems integration level.

One exemplary illustrative non-limiting method for Fault Tree Map generation employs transformation of Fault Trees, using manual means. Other exemplary illustrative non-limiting implementations transform Fault Trees to Fault Tree maps using computerized means. Or a combination of manual and computer techniques may be used to transform a Fault Tree to a Fault Tree map. Involvement of the computerized tool to perform Fault Tree Map generation provides more time economy and results confidence.

An exemplary illustrative non-limiting method for Fault Tree Map generation provides transformation of Fault Trees of production installation, specific installation, technical system/equipment (Hardware and integrated Hardware/Software).

One exemplary illustrative non-limiting method of generating a graphical presentation of a fault tree map for use in technical system or installation design and/or diagnostics, said method comprises creating a fault tree including cut sets and events important evaluation; analyzing the fault tree to determine latent failures, repeated events and gates; generating a compact map of said fault tree, said compact map graphically indicating evident event (failure) type with a first connector symbol and indicating events with exposure time in excess of flight duration (mission time) with a second connector symbol different from said first connector symbol; graphically indicating logic gates with predetermined symbols different from Fault Tree gates image; and graphically presenting said compact fault tree map.

The graphically presenting may comprise repeated events and repeated gates with predetermined symbols/colors. It is possible to indicate different cut sets with different colors and more important event with predetermined symbols. The graphically presenting may comprise displaying said compact fault tree map on an electronic display. One exemplary illustrative non-limiting implementation suppresses from said map, display of wordbased events (failures) and gates descriptions. Failure propagation may be demonstrated by color indicating of the propagation path. Numbers of Fault Tree report pages where gates are placed may be included.

The Fault Tree Map construction and advantages thereof will be best understood from the following description of specific embodiments when read in connection with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features and advantages will be better and more completely understood by referring to the following detailed description of exemplary non-limiting illustrative implementations in conjunction with the drawings of which:

FIGS. 2A-2B are an example of exemplary illustrative non-limiting symbols and marking that may be used for generating an exemplary illustrative non-limiting Fault Tree Map;

FIG. 4 is a block diagram showing an exemplary illustrative non-limiting fault tree map generation process;

FIG. 5 is an exemplary illustrative non-limiting flowchart for computer-assisted fault tree map generation; and FIG. 6 shows an exemplary illustrative non-limiting data base transformation diagram.

DETAILED DESCRIPTION

Figure 1A:
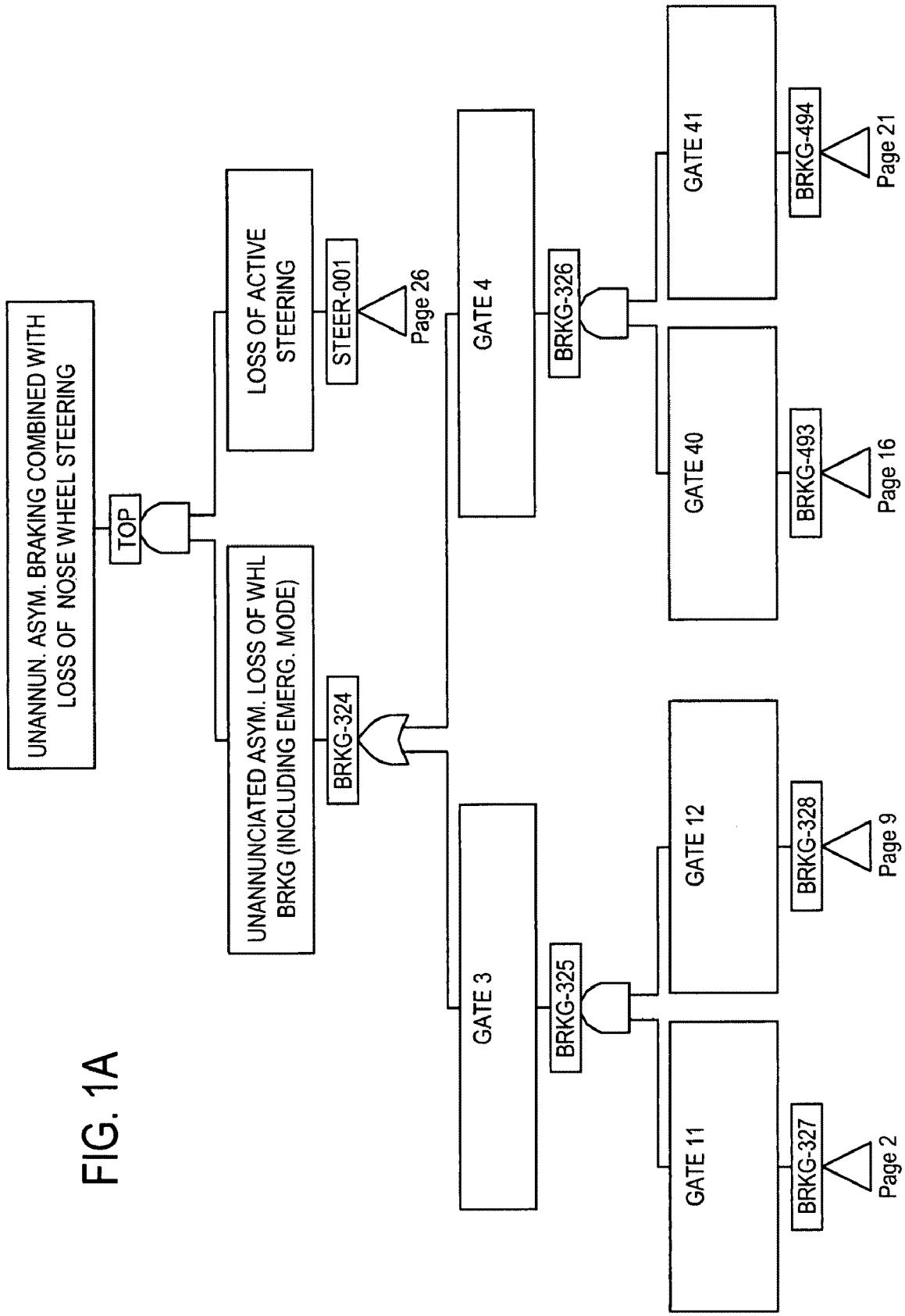
FIGS. 1A-1AF are together an exemplary illustrative non-limiting conventional Fault Tree for an aeronautical application such as fault analysis for an aircraft.
Figure 1B:
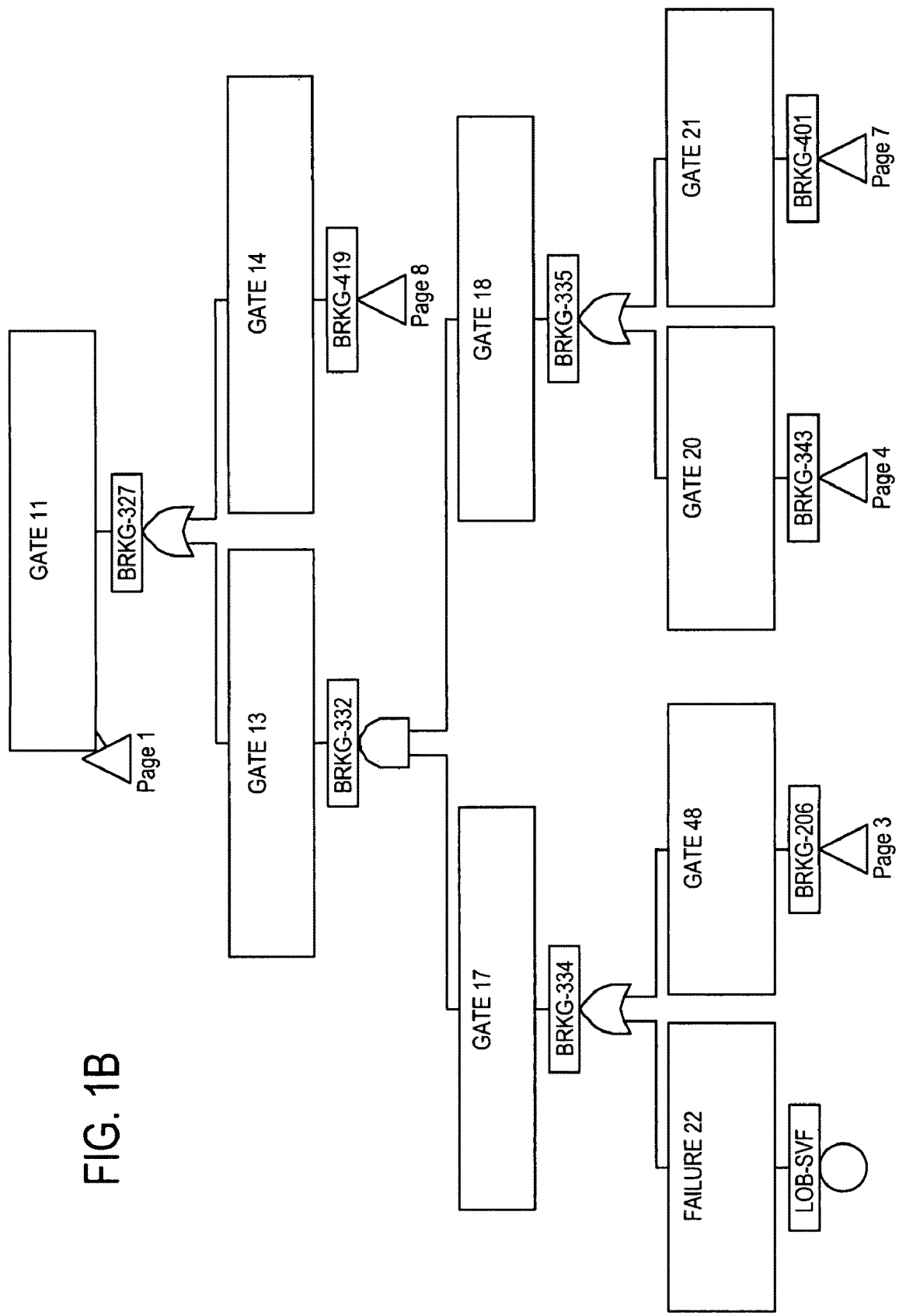
Figure 1C:
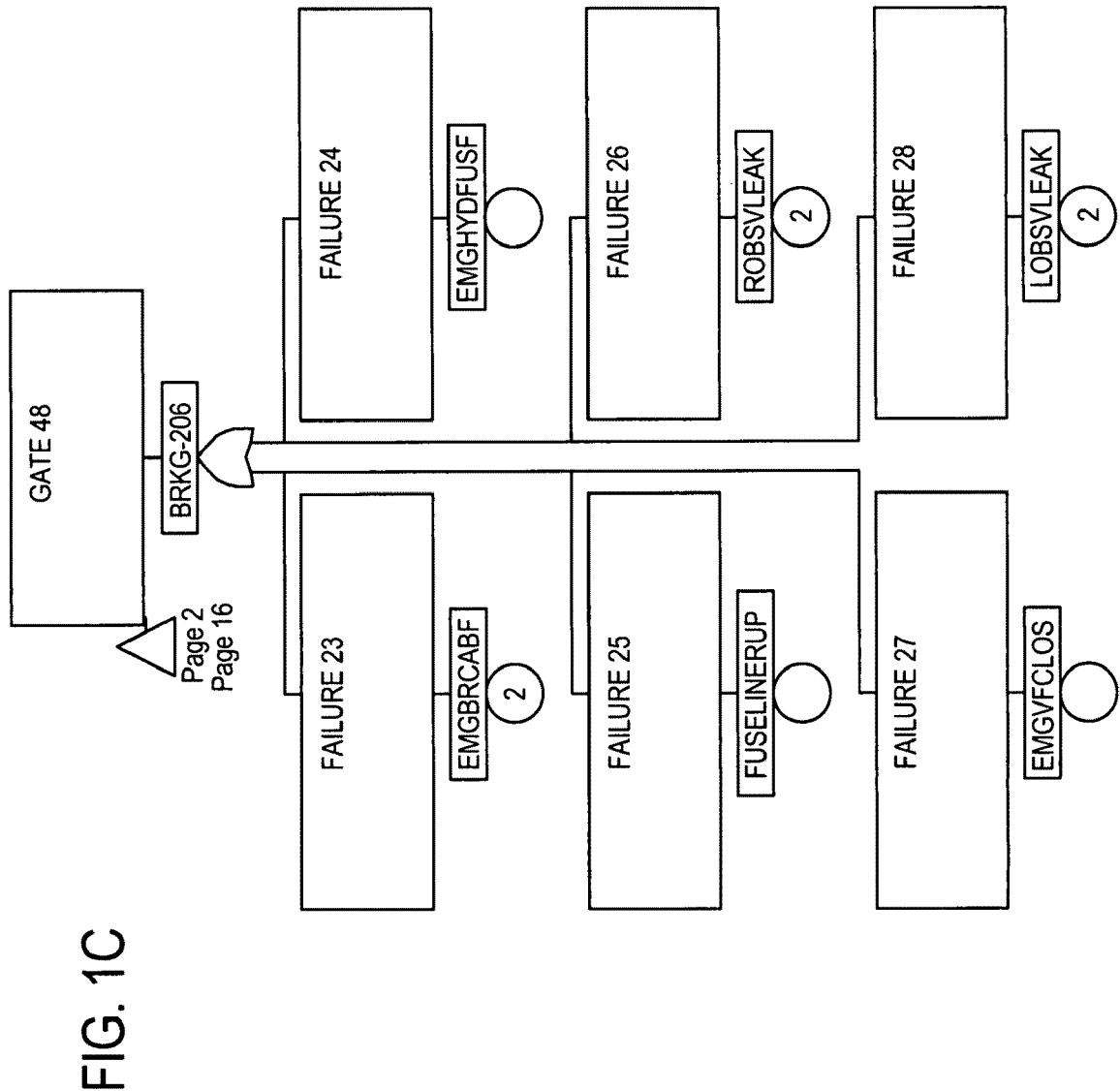
Figure 1D:
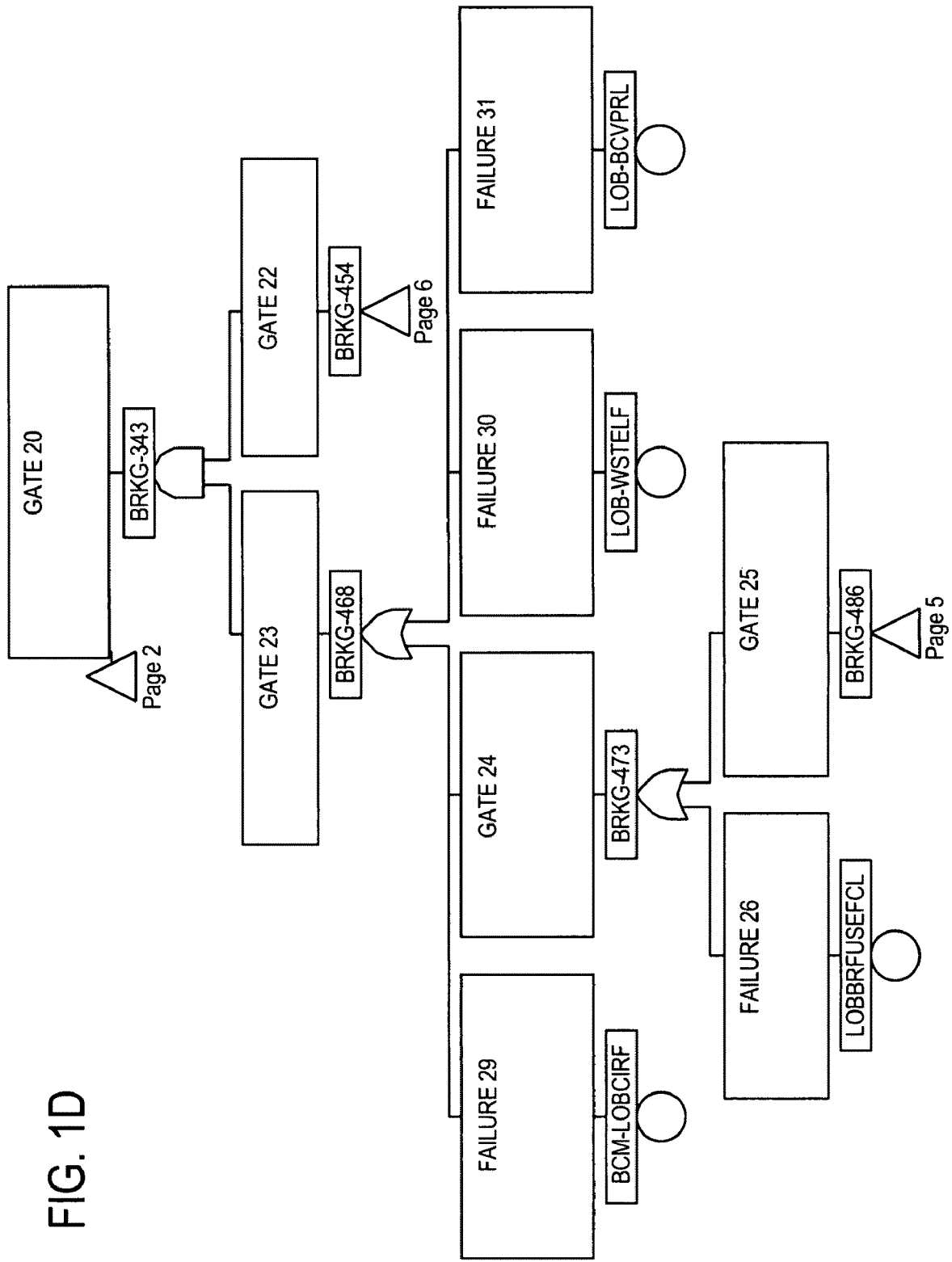
Figure 1E:
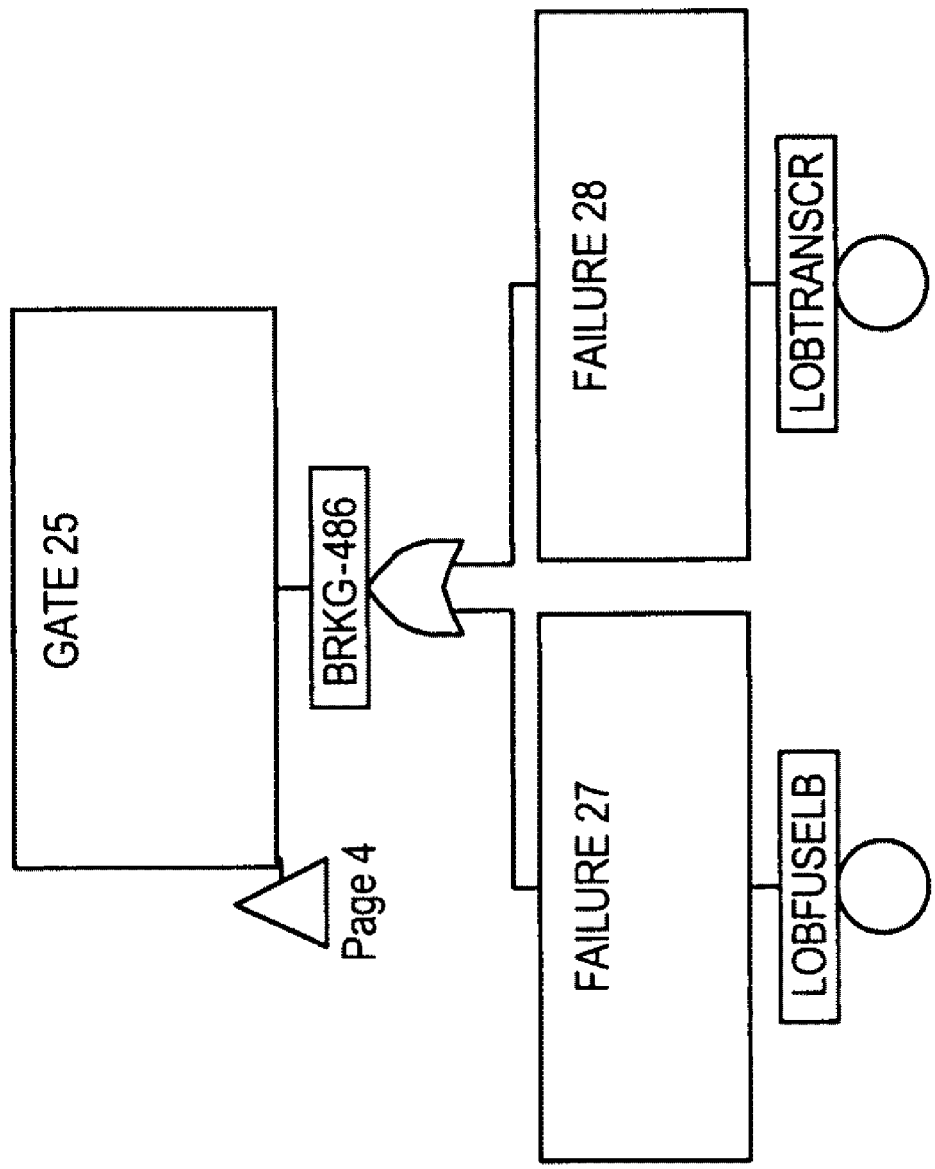
Figure 1F:
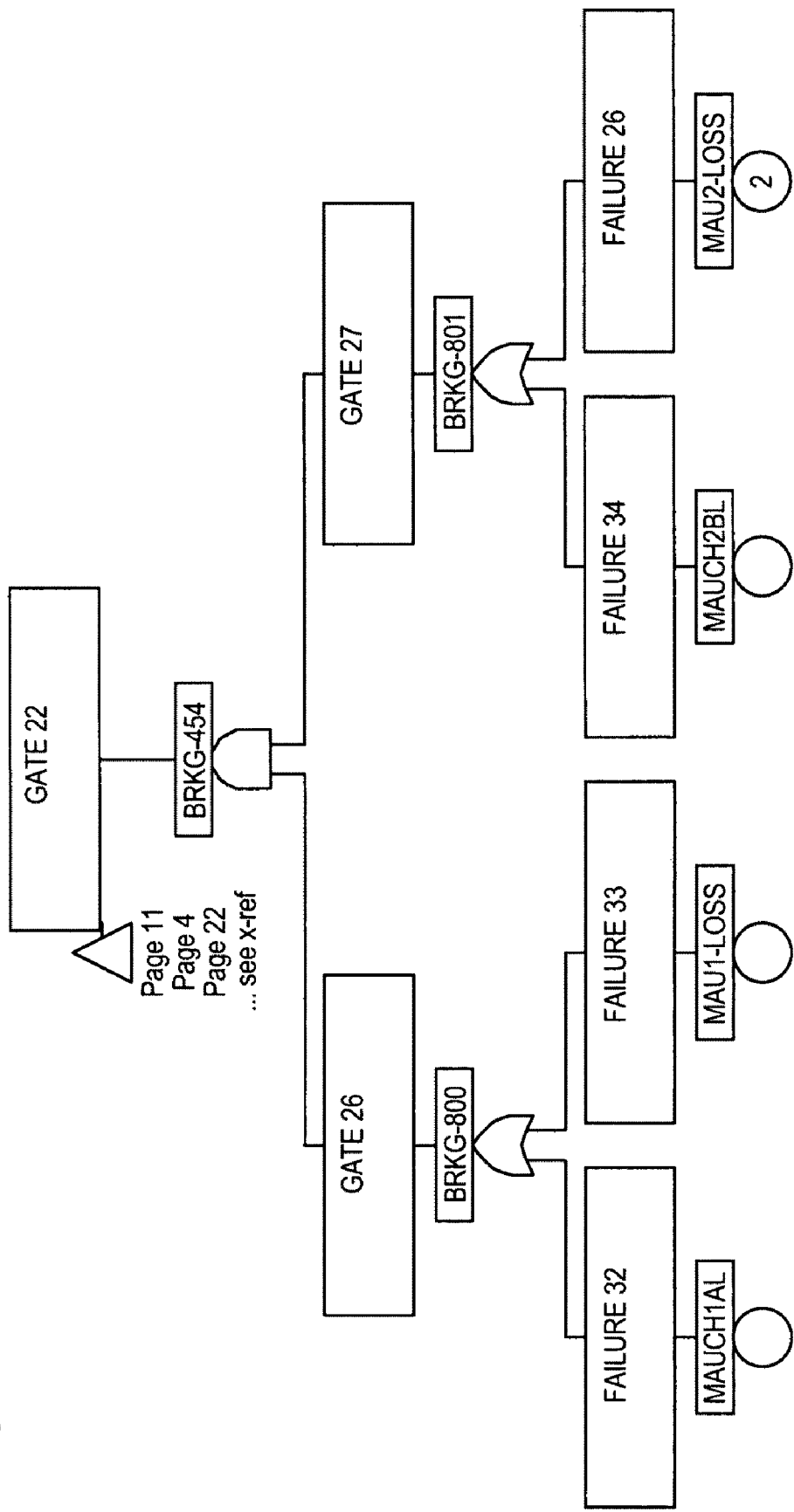
Figure 1G:
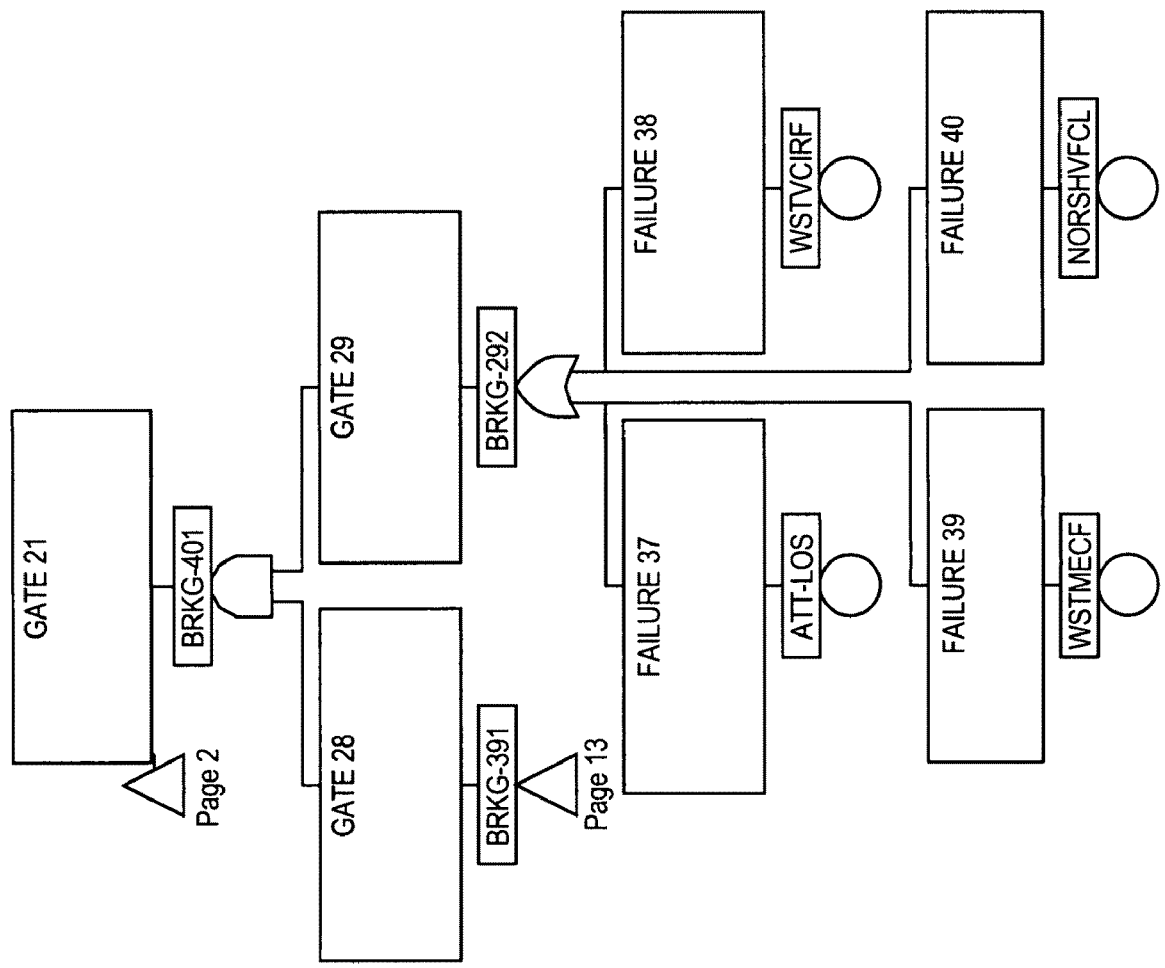
Figure 1H:
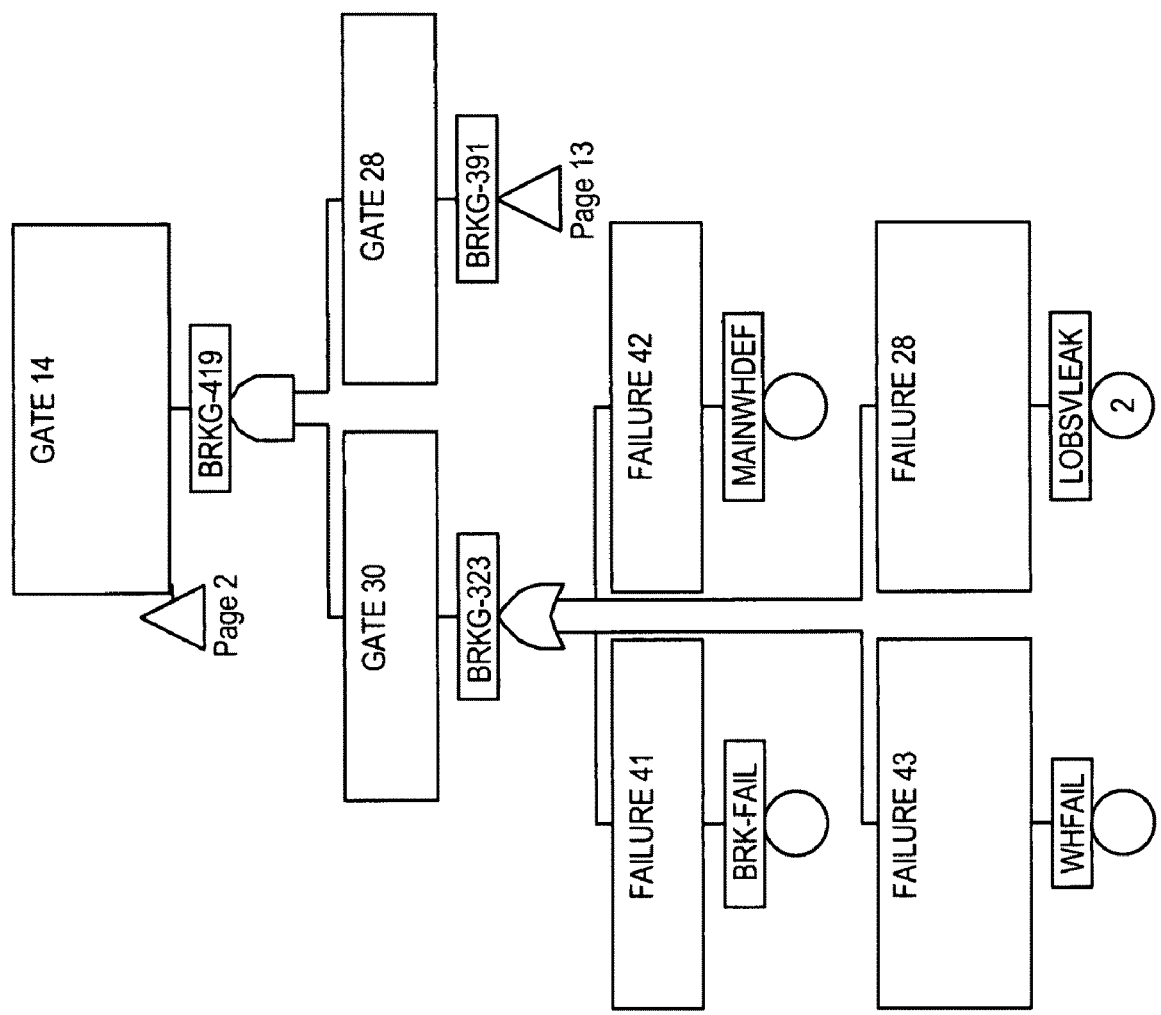
Figure 1I:
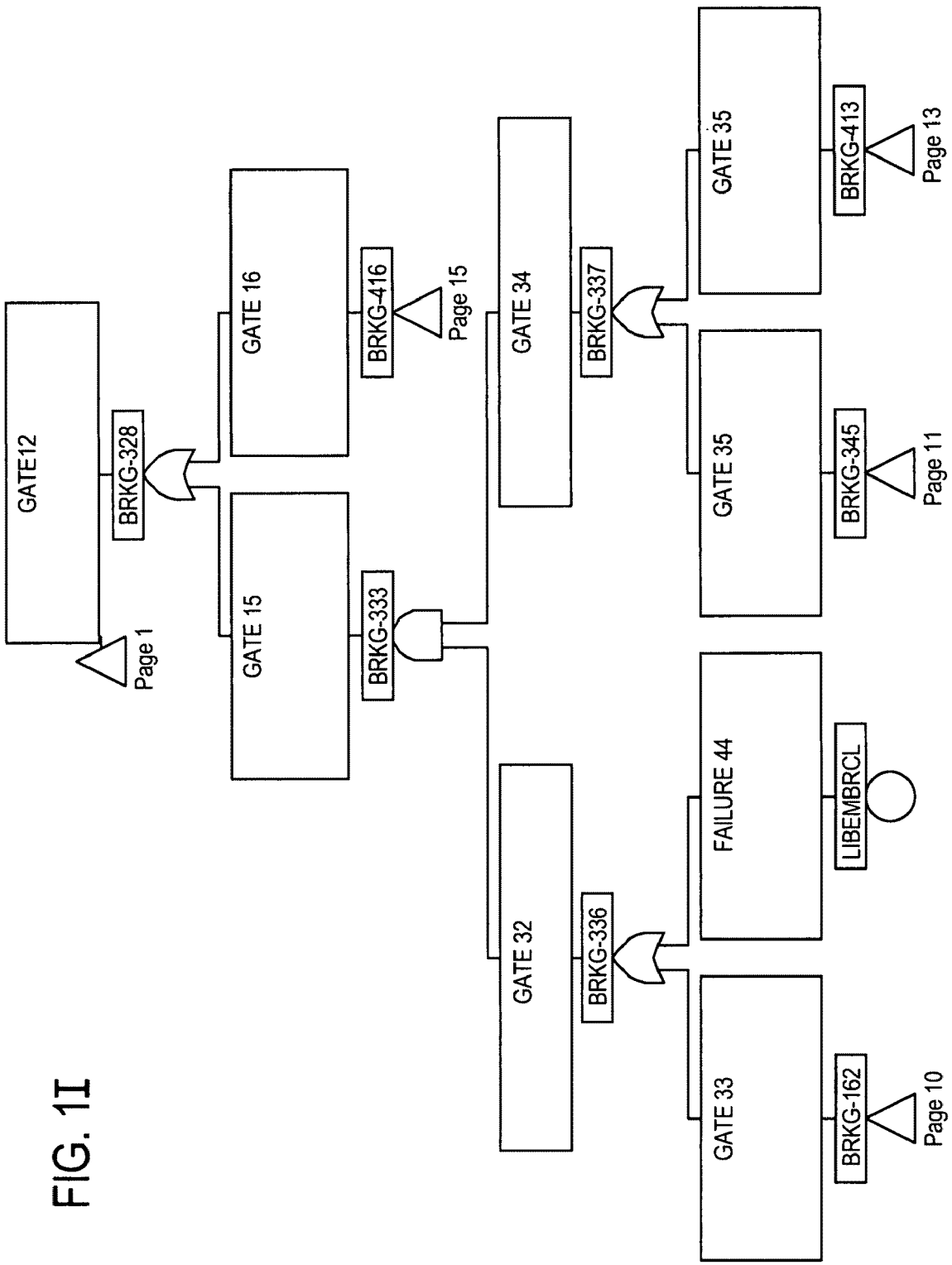
Figure 1J:
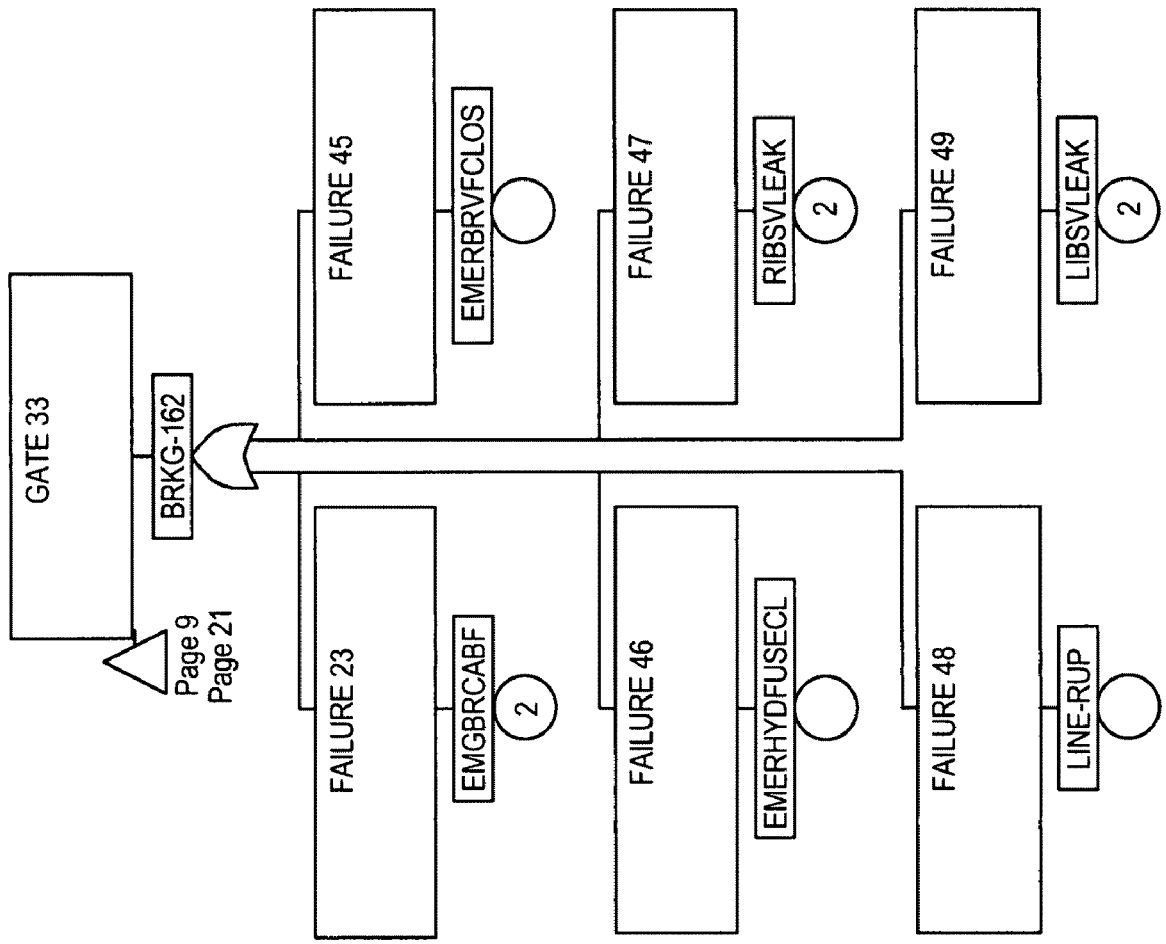
Figure 1K:
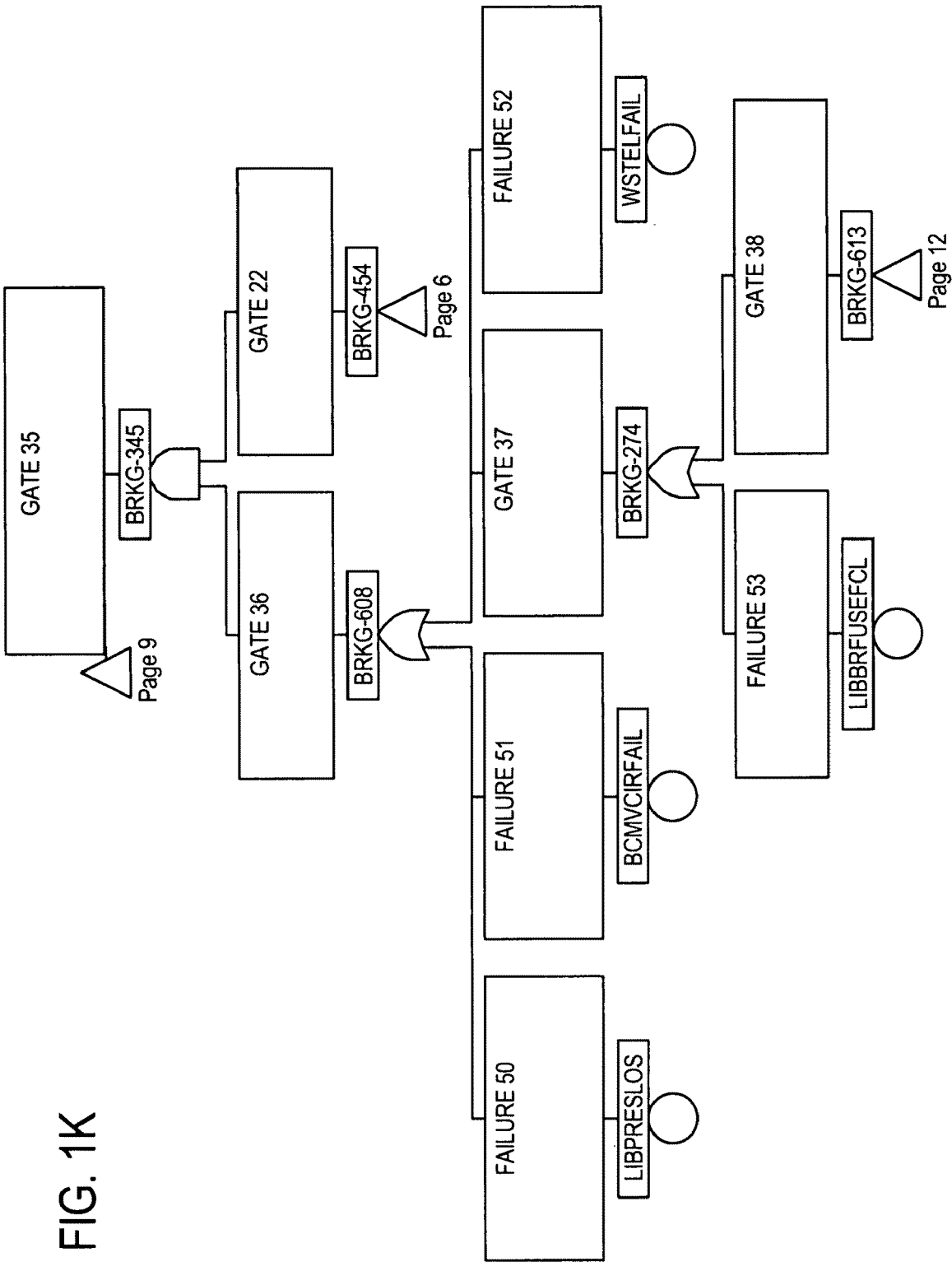
Figure 1L:
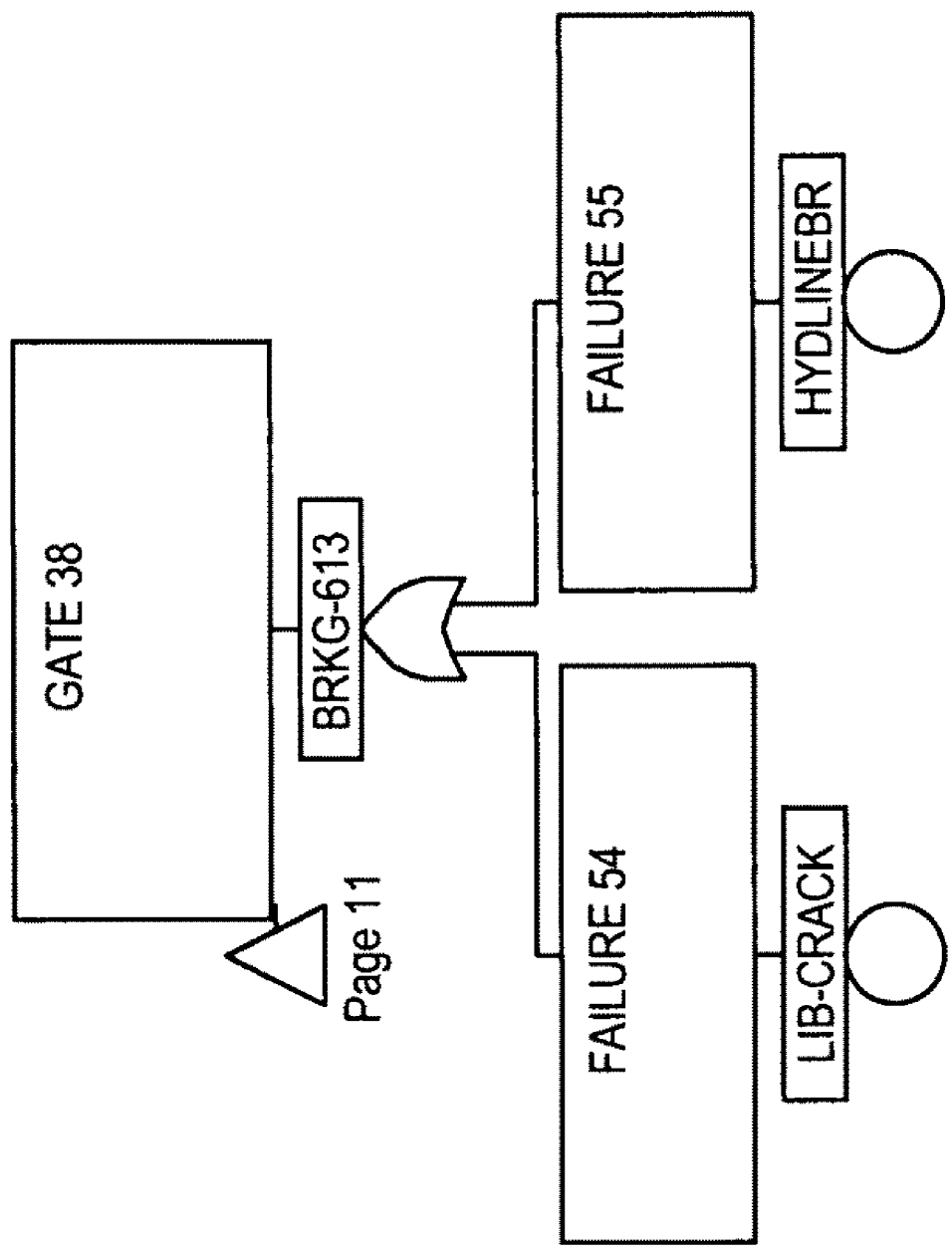
Figure 1M:
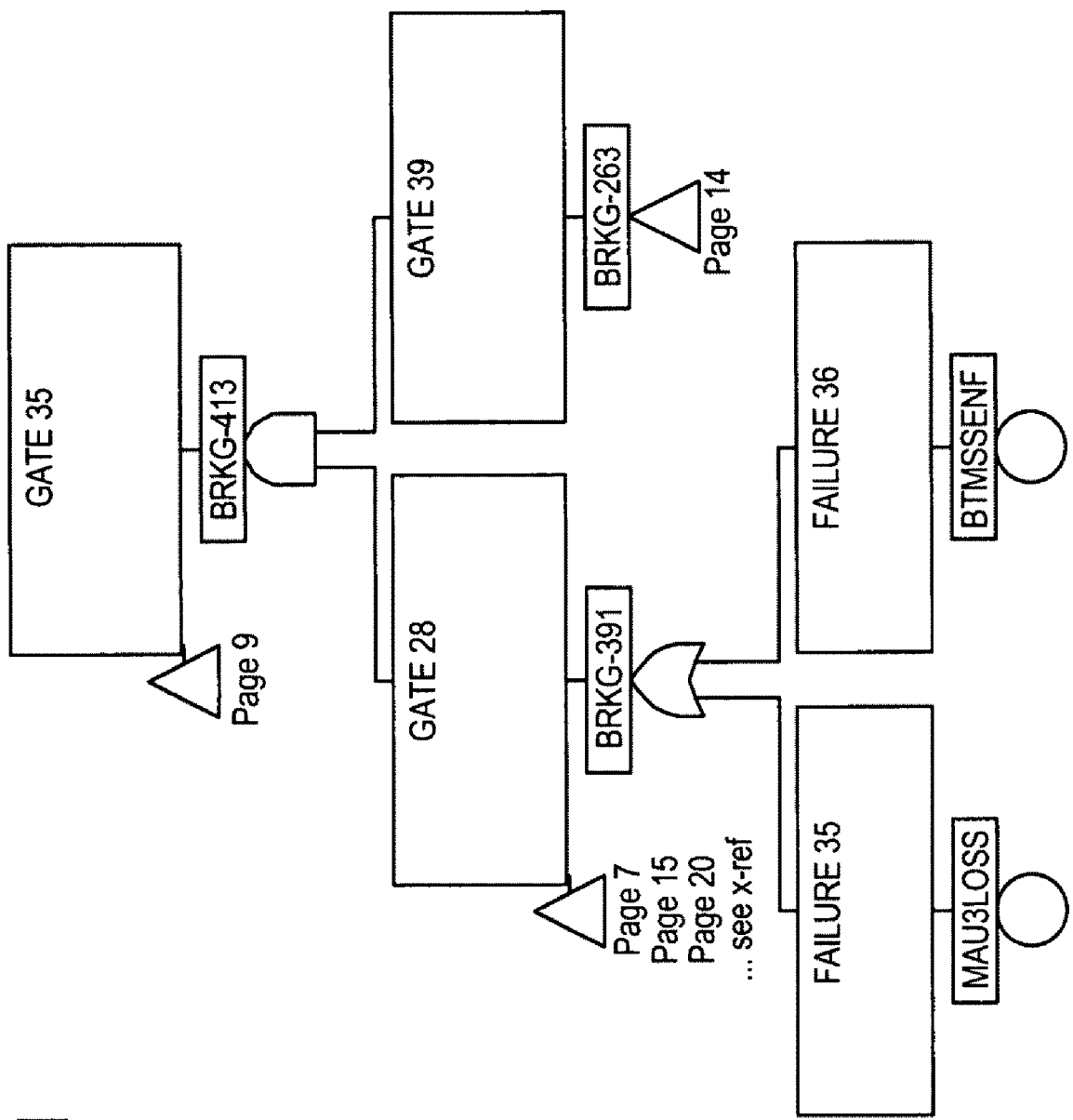
Figure 1N:
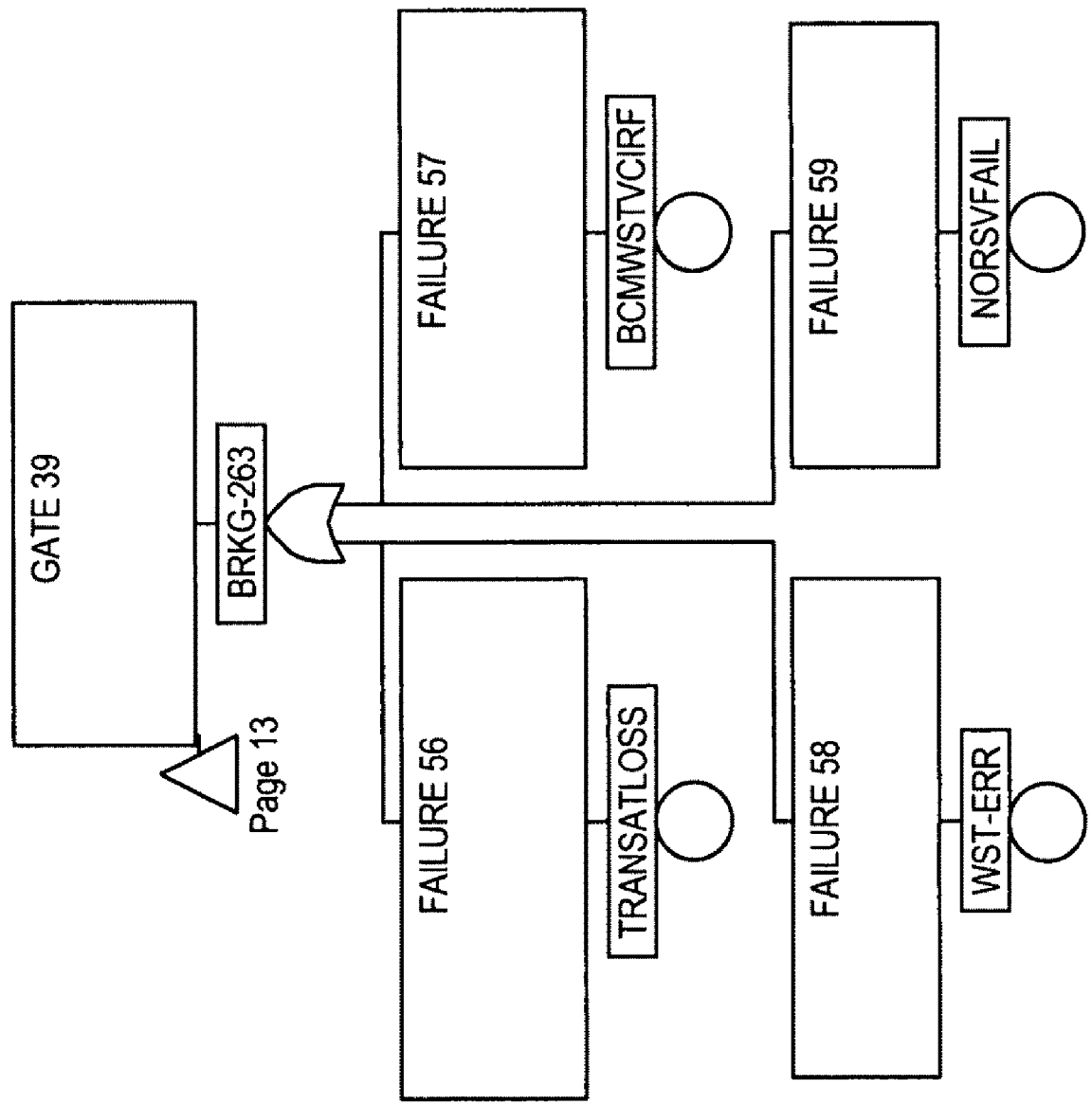
Figure 10:
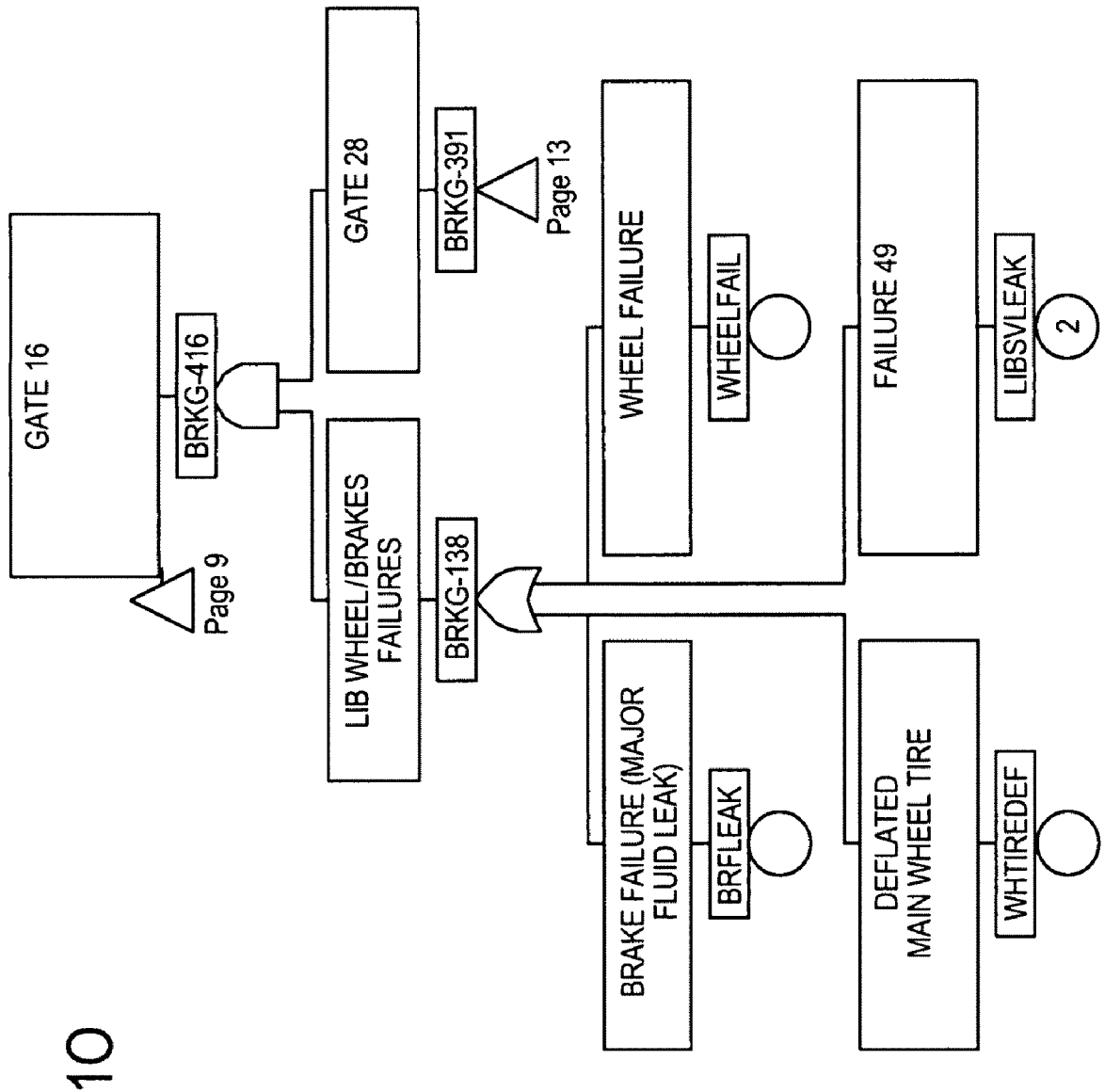
Figure 1P:
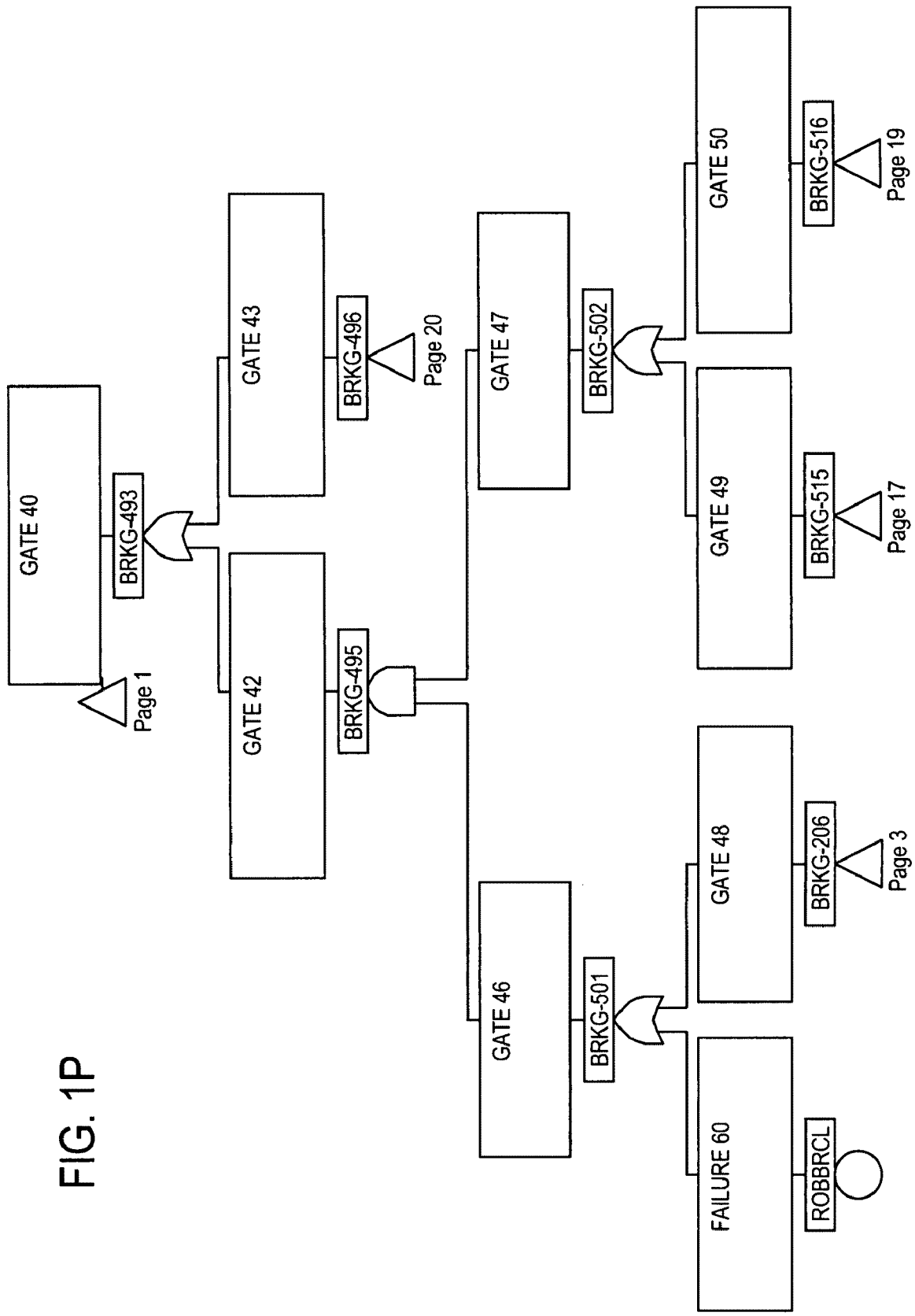
Figure 1Q:
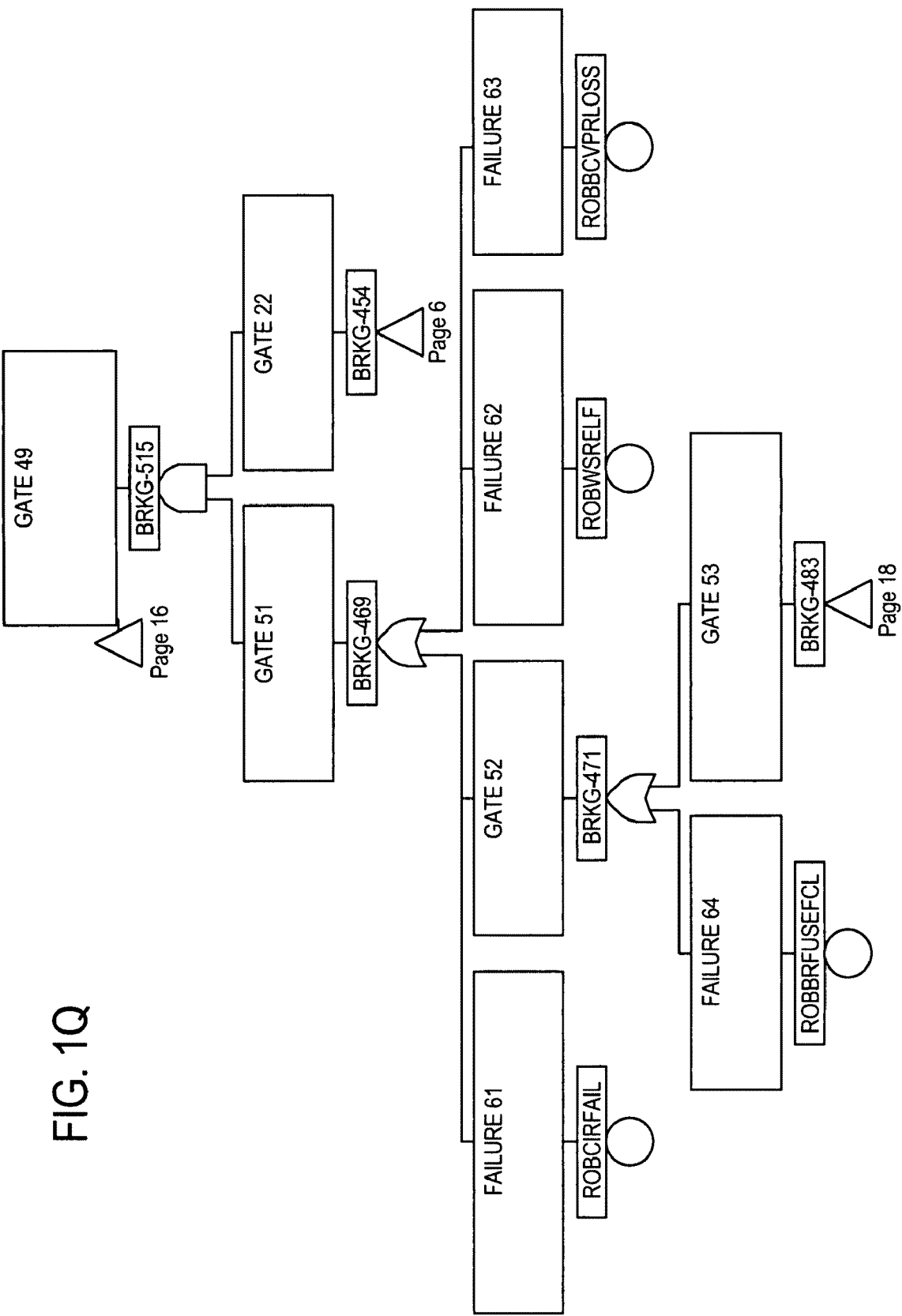
Figure 1R:
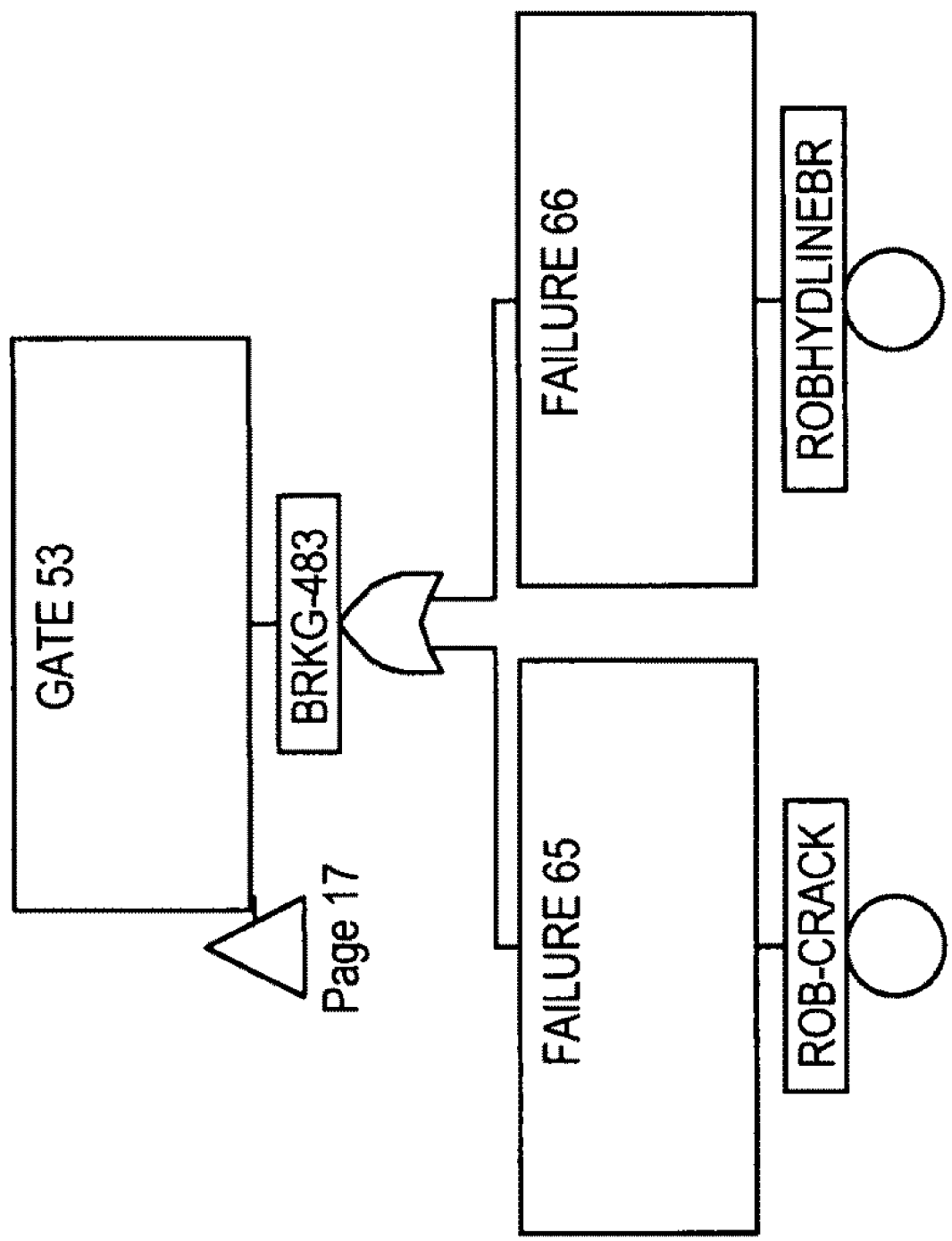
Figure 1S:
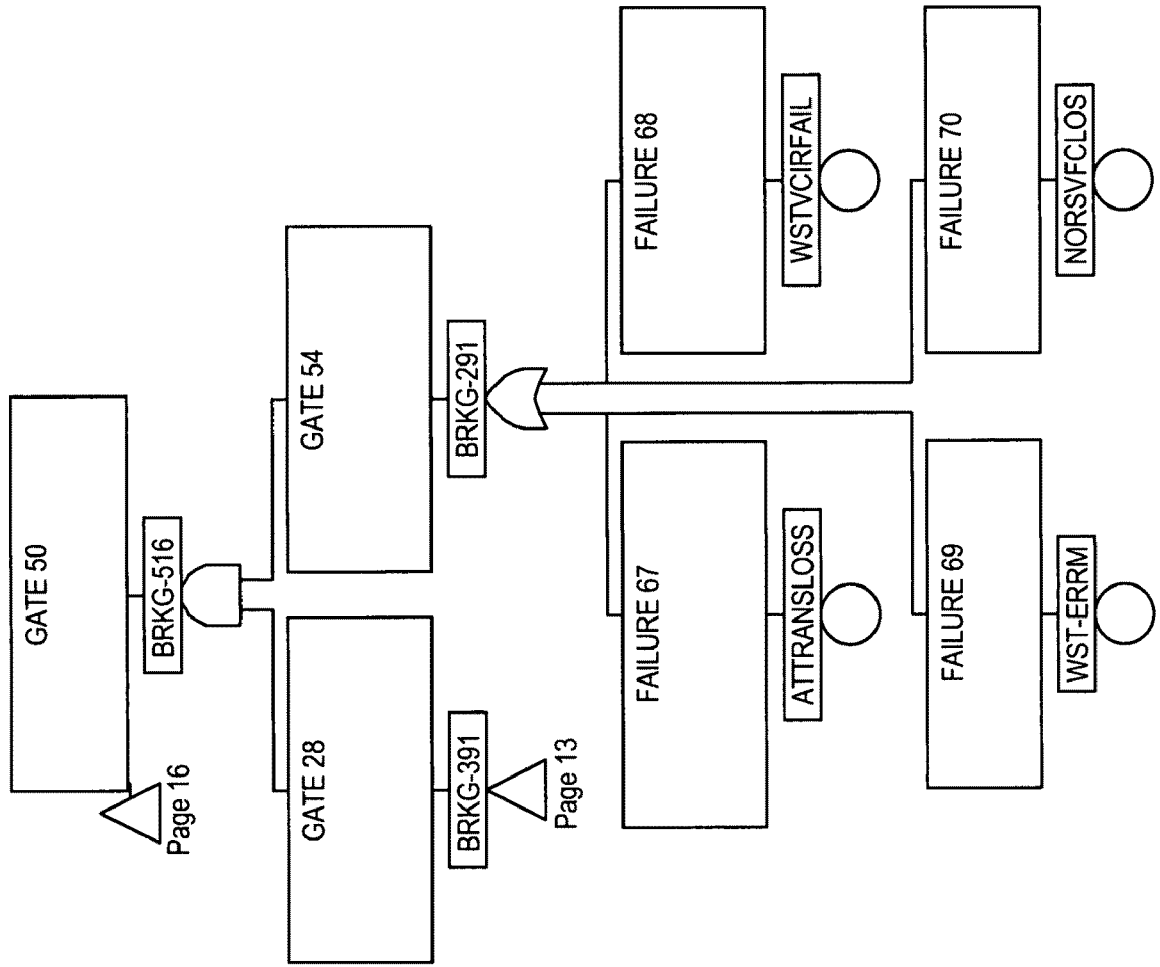
Figure 1T:
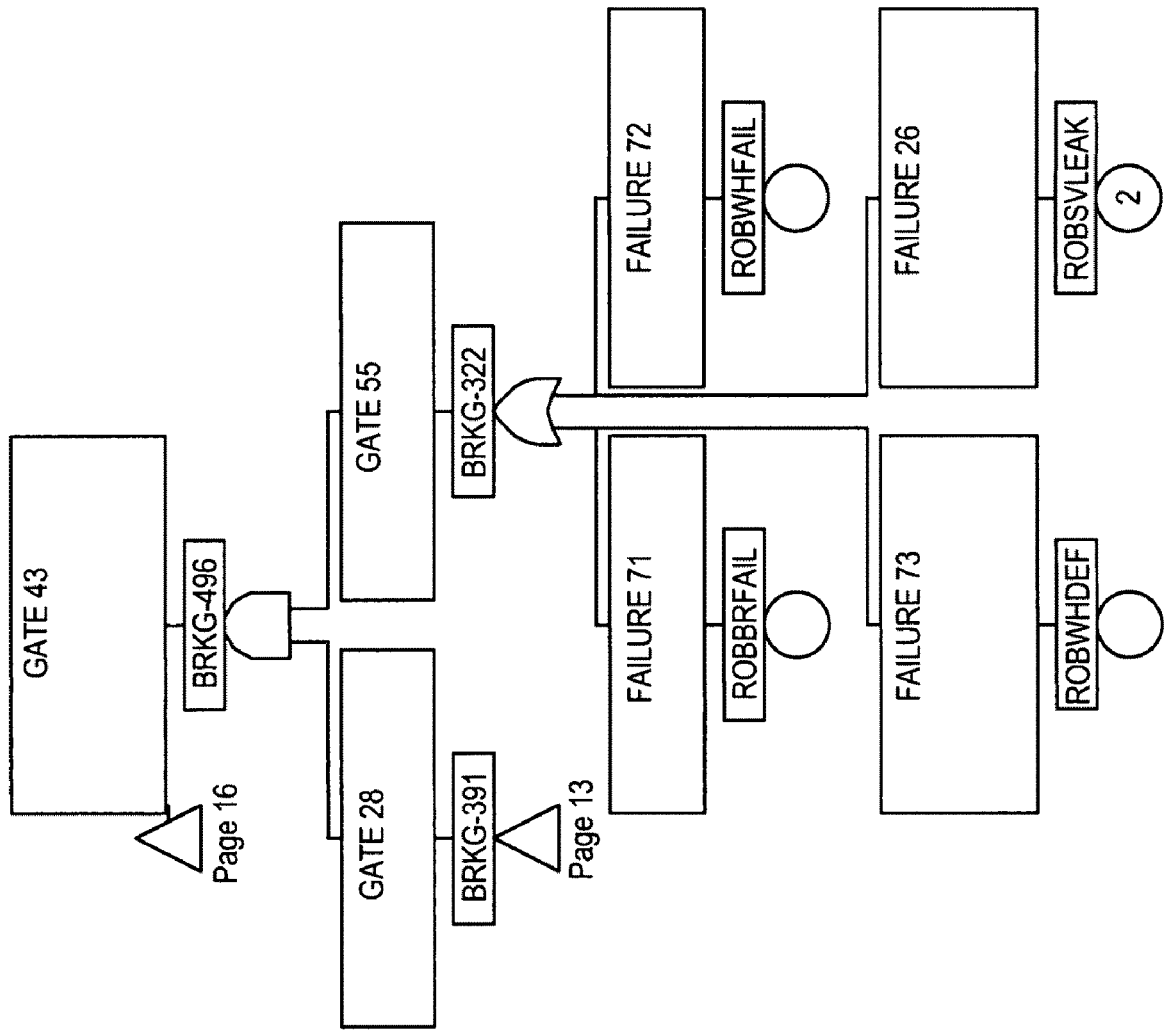
Figure 1U:
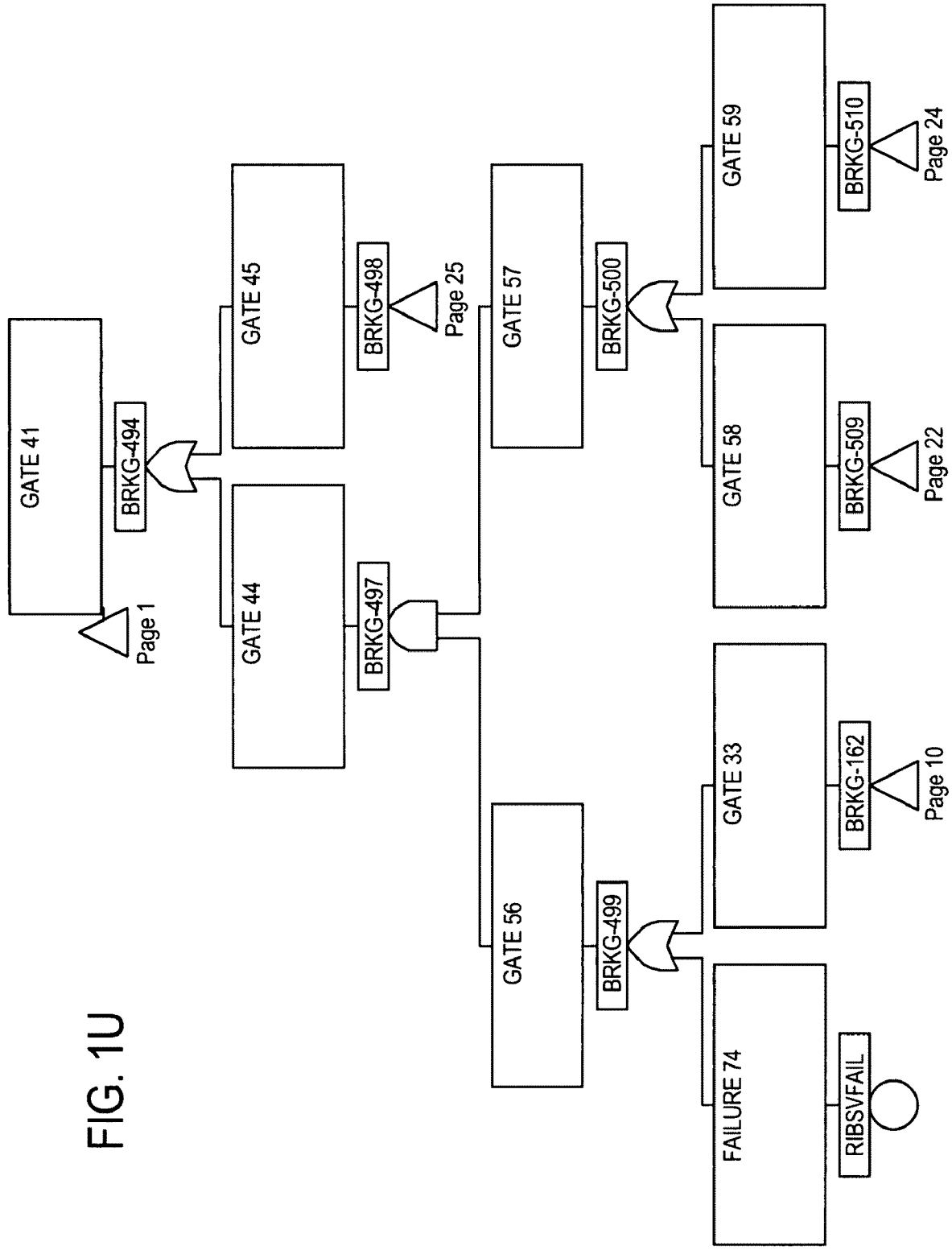
Figure 1V:
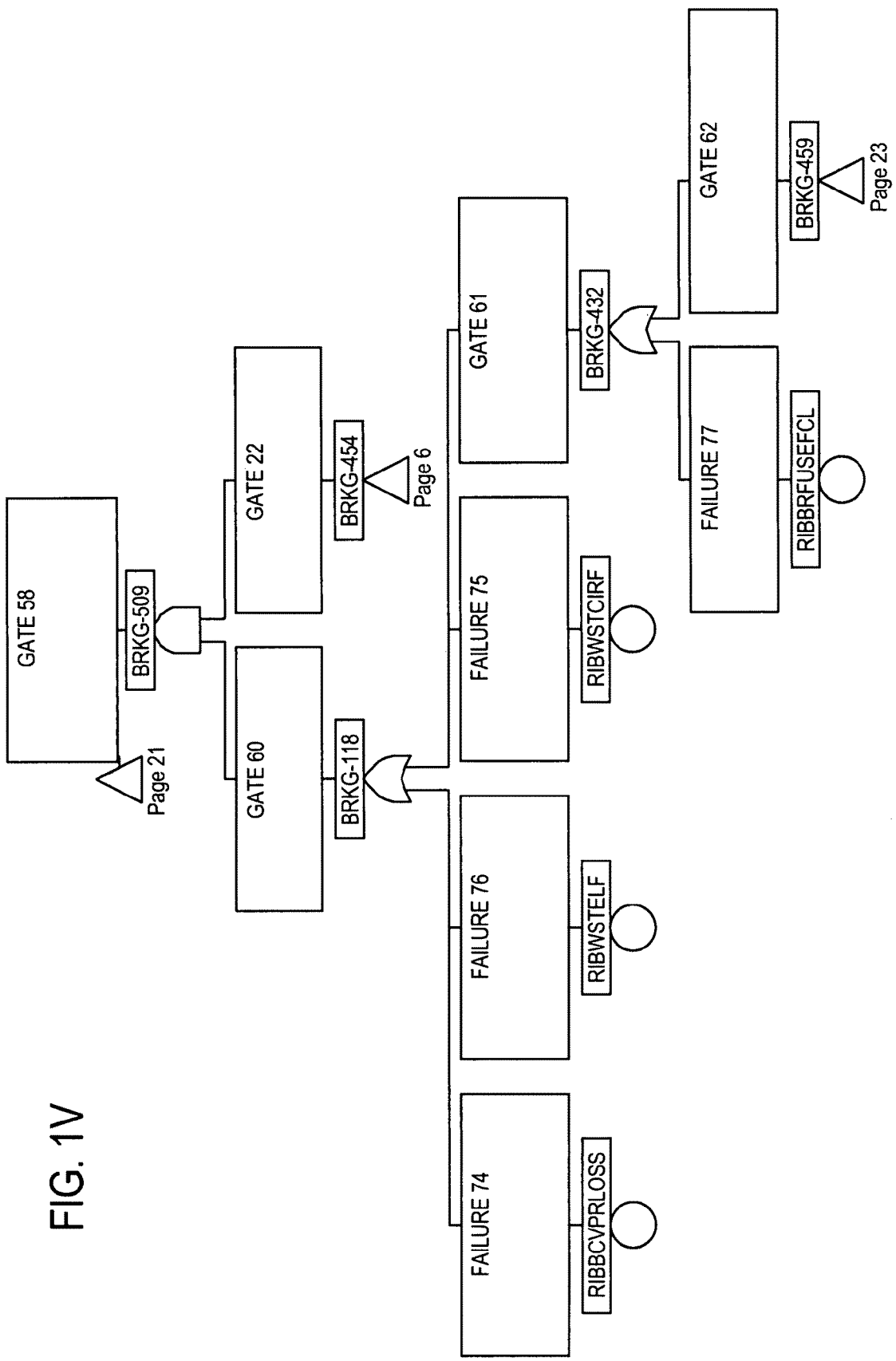
Figure 1W:
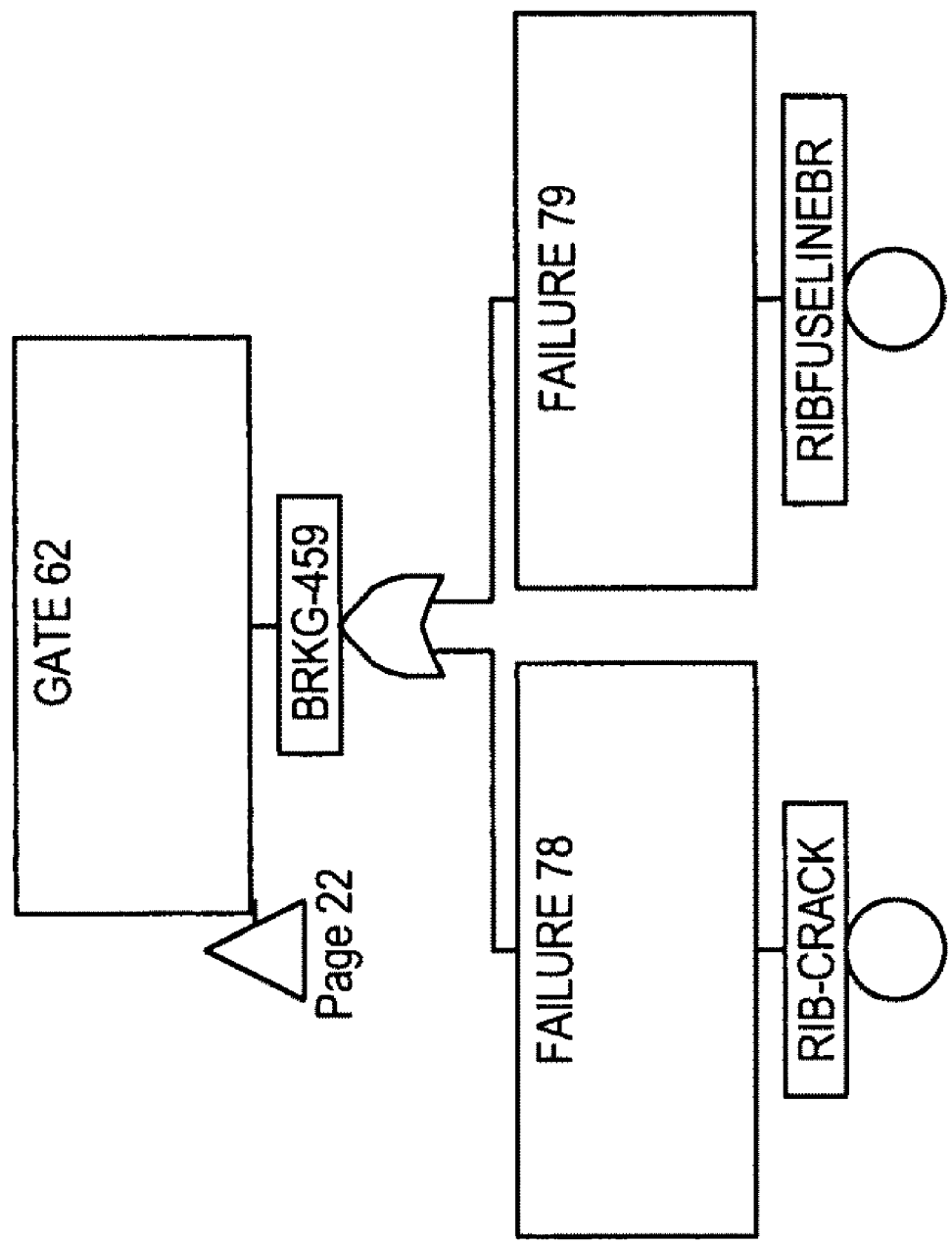
Figure 1X:
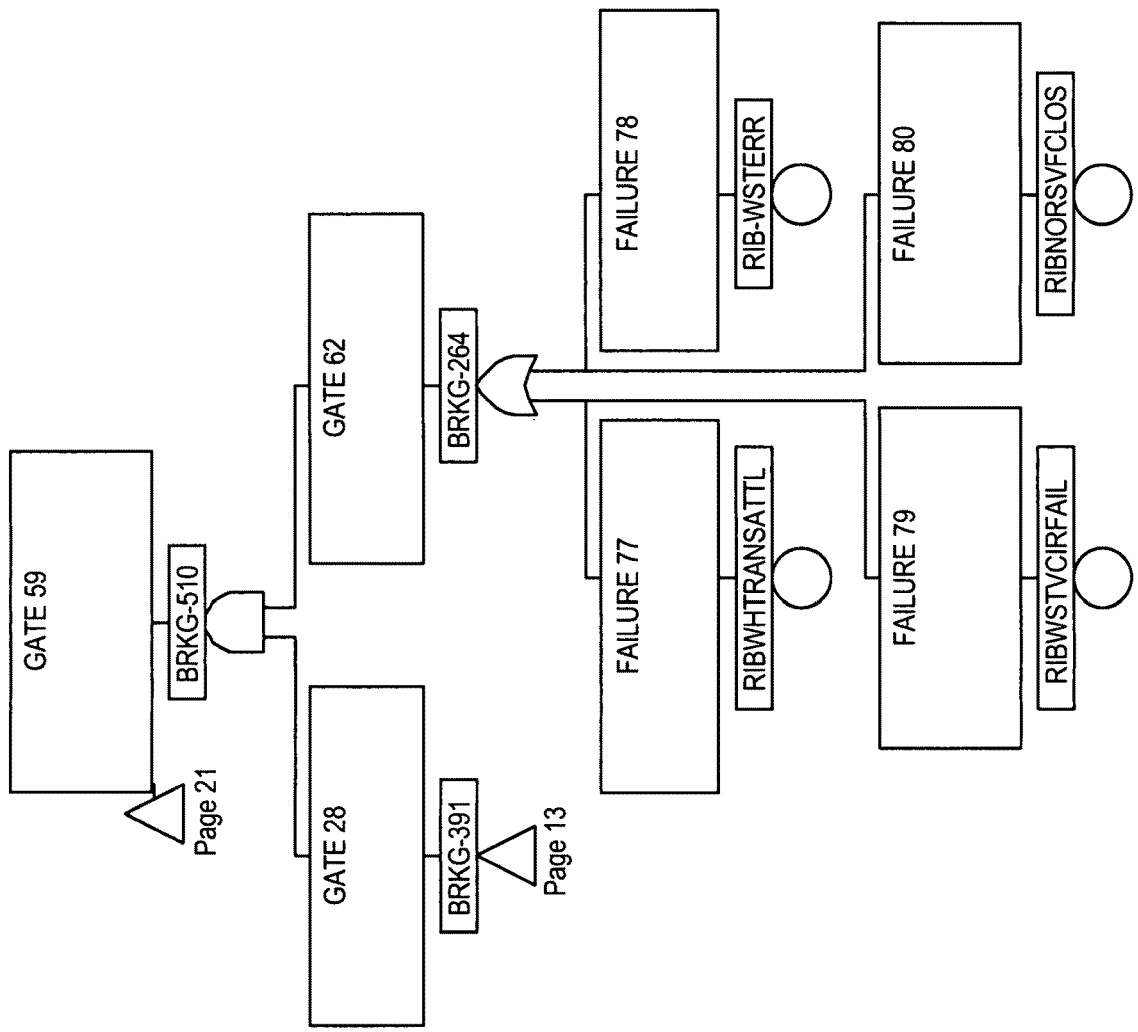
Figure 1Y:
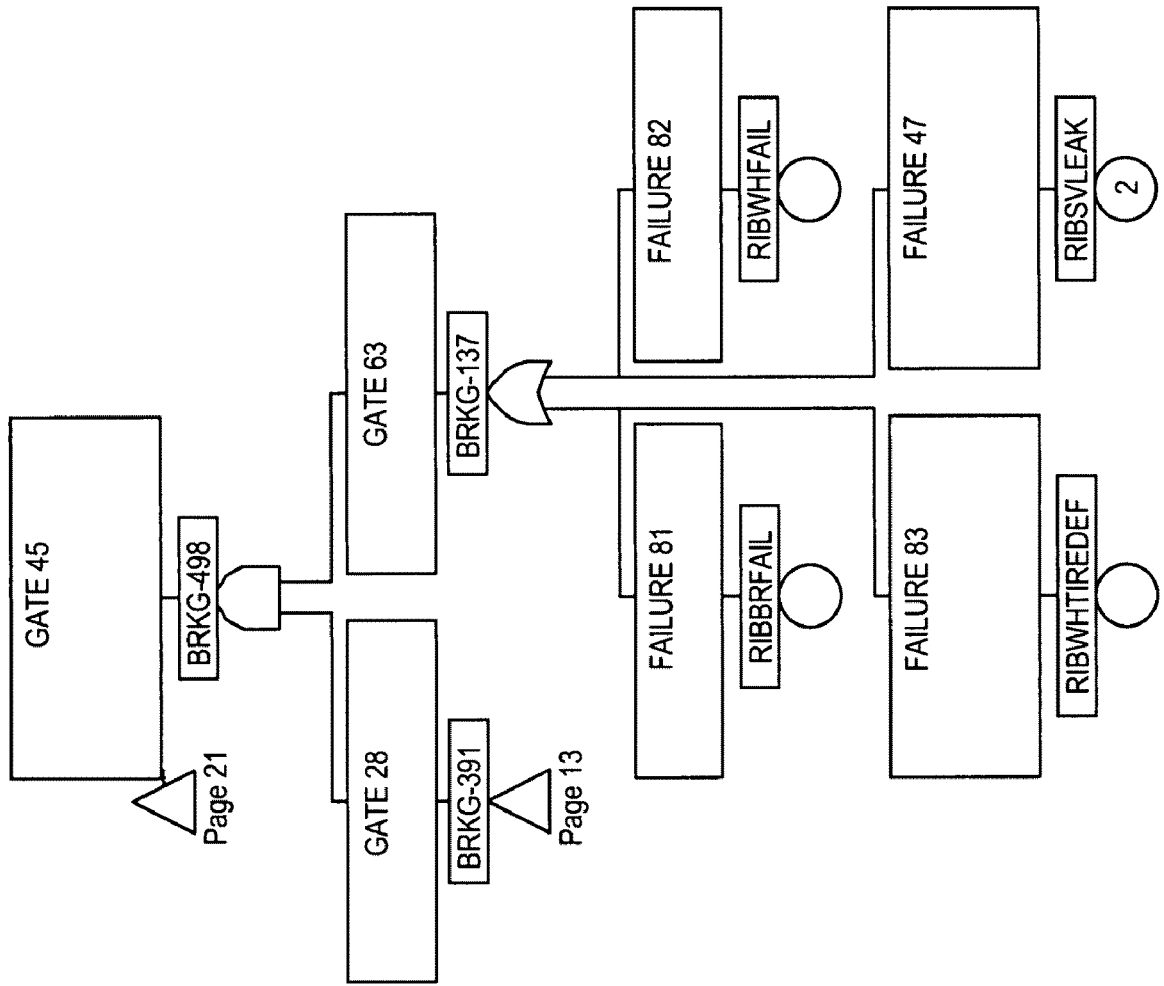

FIGS. 1A-1AF show an exemplary illustrative non-limiting conventional fault tree of the type that is used in many industries and applications to conduct fault and reliability analysis. The example fault tree shown in these Figures shows faults and system behavior for an example aircraft braking condition. However, any type of aircraft or other system, including but not limited to other vehicular or transportation systems, medical systems, first responder emergency systems, communications systems, power grid systems including nuclear reactors, or any other complex or other system can be analyzed using a fault tree in a similar fashion as is known to those skilled in the art.

Those skilled in the art will recognize the features of the conventional fault tree shown in FIGS. 1A-1AE. For example, they will recognize the "top event" shown in FIG. 1A (braking loss combined with loss of nosewheel steering) that represents a potentially aircraft failure mode, as well as the failure events (loss of wheel braking ANDed with loss of active steering) that will result in such failure mode. They will also recognize that to fully analyze the failure nodes and dependencies that contribute to such failure mode may require many hours of complex study across the various pages of the FIG. 1A-FIG. 1AE fault tree. Those skilled in the art will further understand that the particular exemplary illustrative fault tree represented by FIGS. 1A-1AE is by no means the most complex fault tree one may envision, and that complex systems may commonly have fault trees that are substantially more complex with hundreds of failure nodes and associated logic.

Figure 3A:
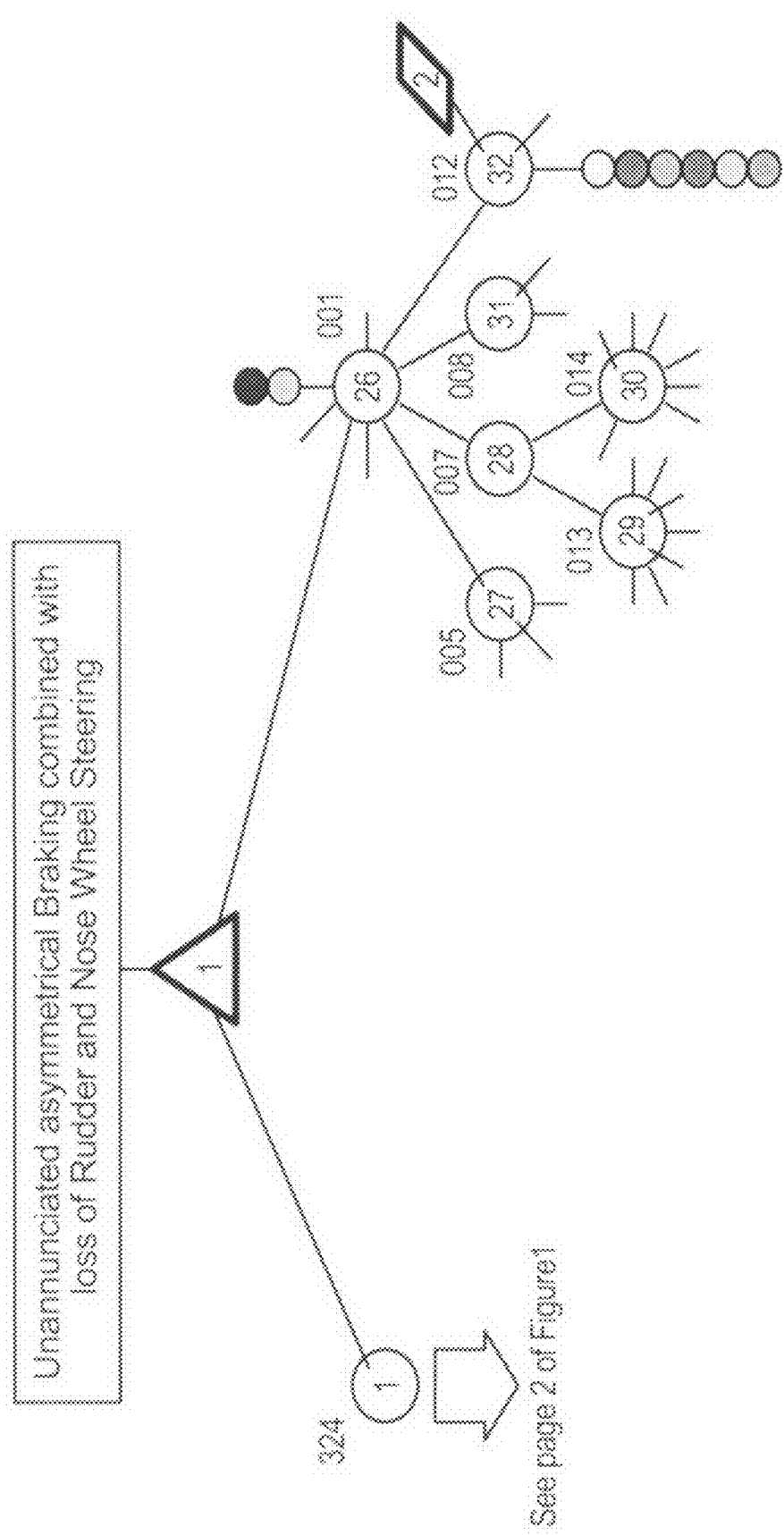
FIGS. 3A-3B show an exemplary illustrative non-limiting Fault Tree Map that corresponding to the conventional Fault Tree shown in FIGS. 1A-1AF.
Figure 3B:
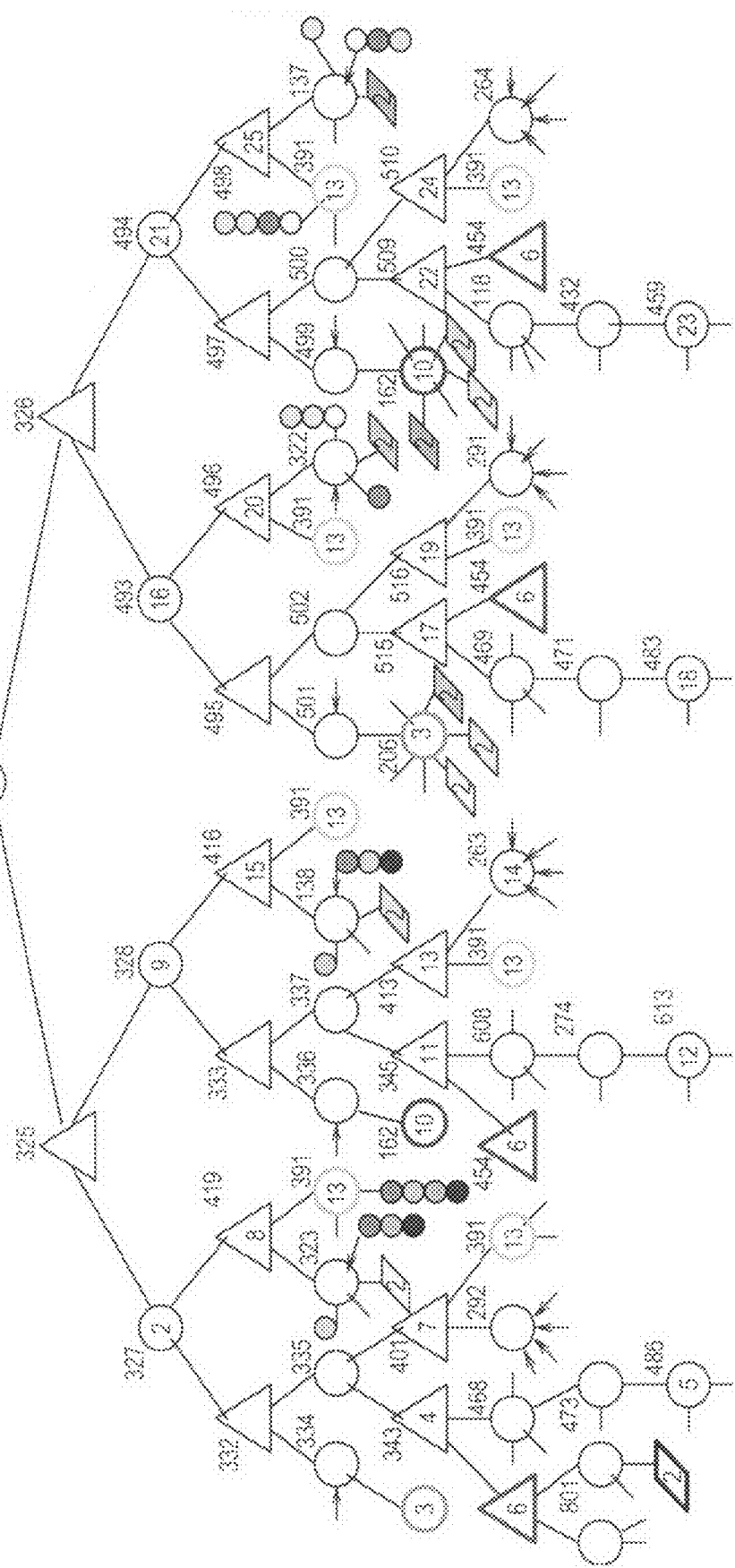

In accordance with one aspect of an exemplary illustrative non-limiting implementation of the technology herein, patentee transforms the exemplary fault tree shown in FIGS. 1A-1AE into the exemplary fault tree map shown in FIGS. 3A-3B to provide a much more compact, distilled, easy to understand, easy to analyze and highly useful representation of the same system fault behavior. The fault tree map of FIGS. 3A-3B can be analyzed on its own, or it can be used as a guide for traversing the more complex complete fault tree map of FIGS. 1A-1AE, or both.

Figure 2A:
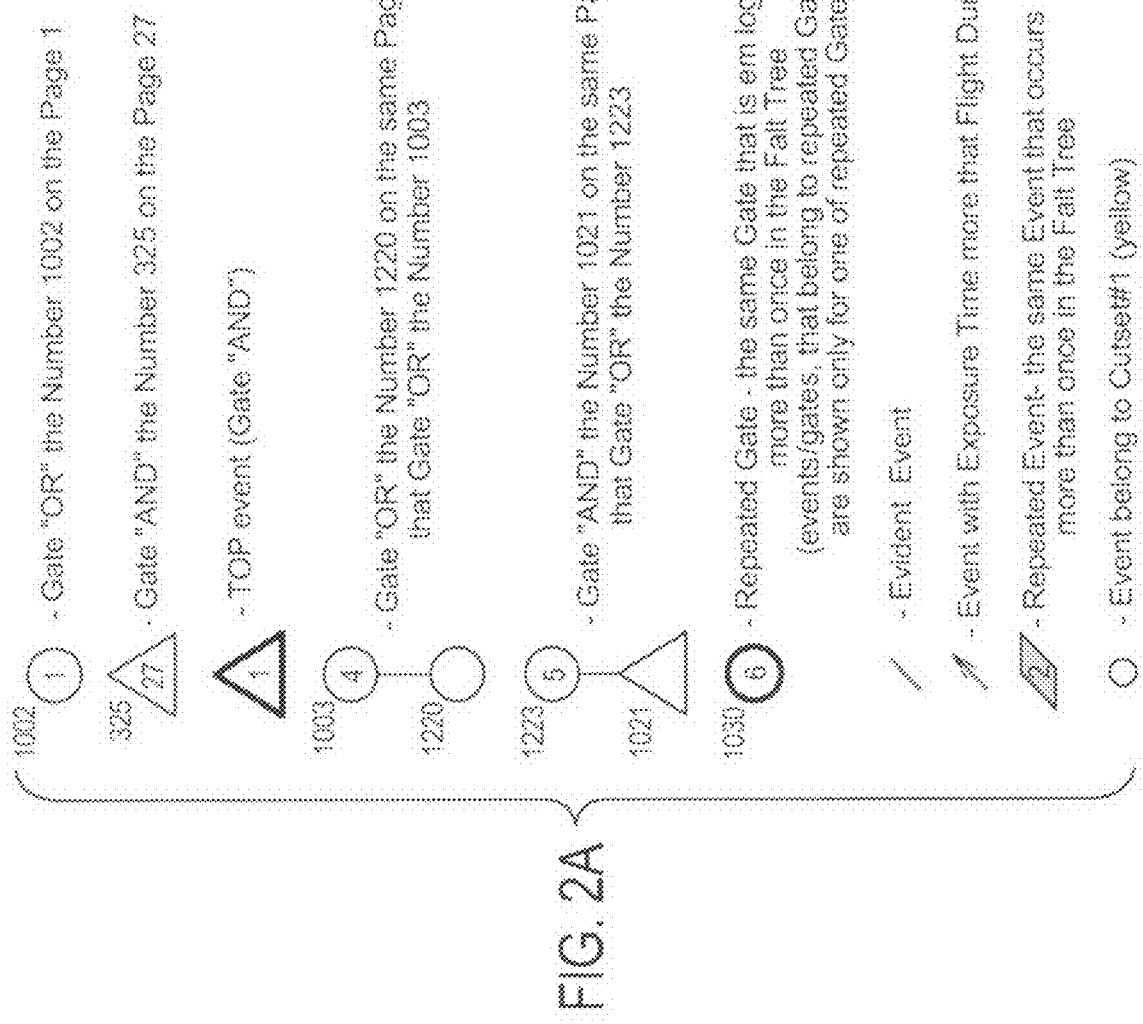

FIGS. 2A-2B show exemplary illustrative symbols that the Fault Tree map of FIGS. 3A-3B uses to represent information. These symbols are only exemplary (others can be used instead). Additionally, the illustrative exemplary non-limiting implementation colors these symbols with different colors to make them more distinctive and easy to recognize and read. As can be seen, top events can be represented by a distinctive symbol such as a bold triangle of a particular color. AND gates can be represented by triangles (as opposed to the conventional AND gate symbol used by logic designers), and OR gates can be represented by circles (as opposed to the conventional OR gate symbol used by logic designers). Repeated gates can be represented by bold circles of a distinctive color. Evident events can be represented by strokes. Events with exposure time more than the typical operation duration of the system can be represented by strokes with arrows. Repeated events may be represented by specially colored trapezoids. Cutset events may be represented by distinctive colored circles, with different cut sets color coded with different colors. Intermediate connections may be represented by rounded squares. Other symbol and color schemes may be used instead.

Figure 1Z:
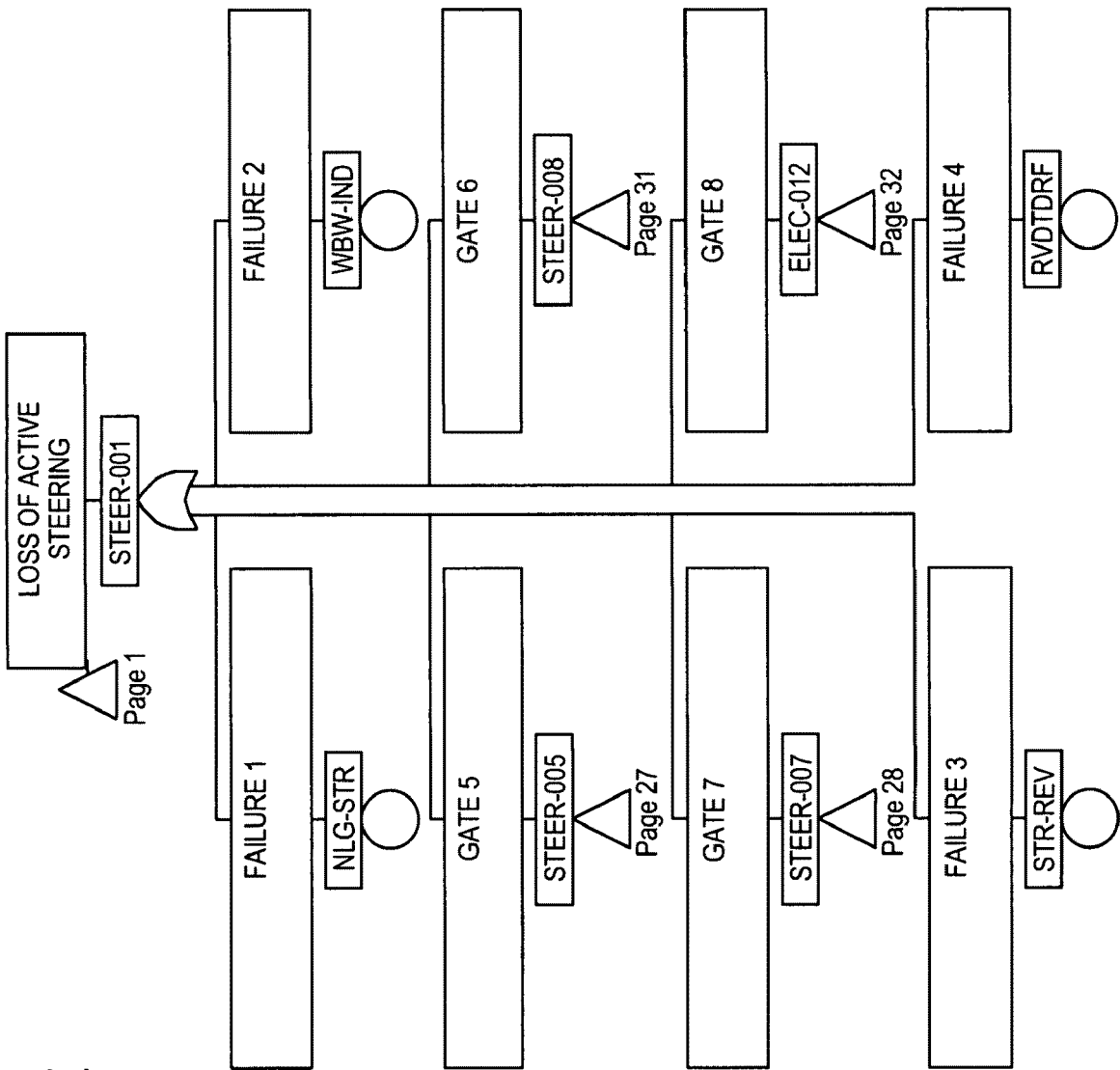
Figure 1A:
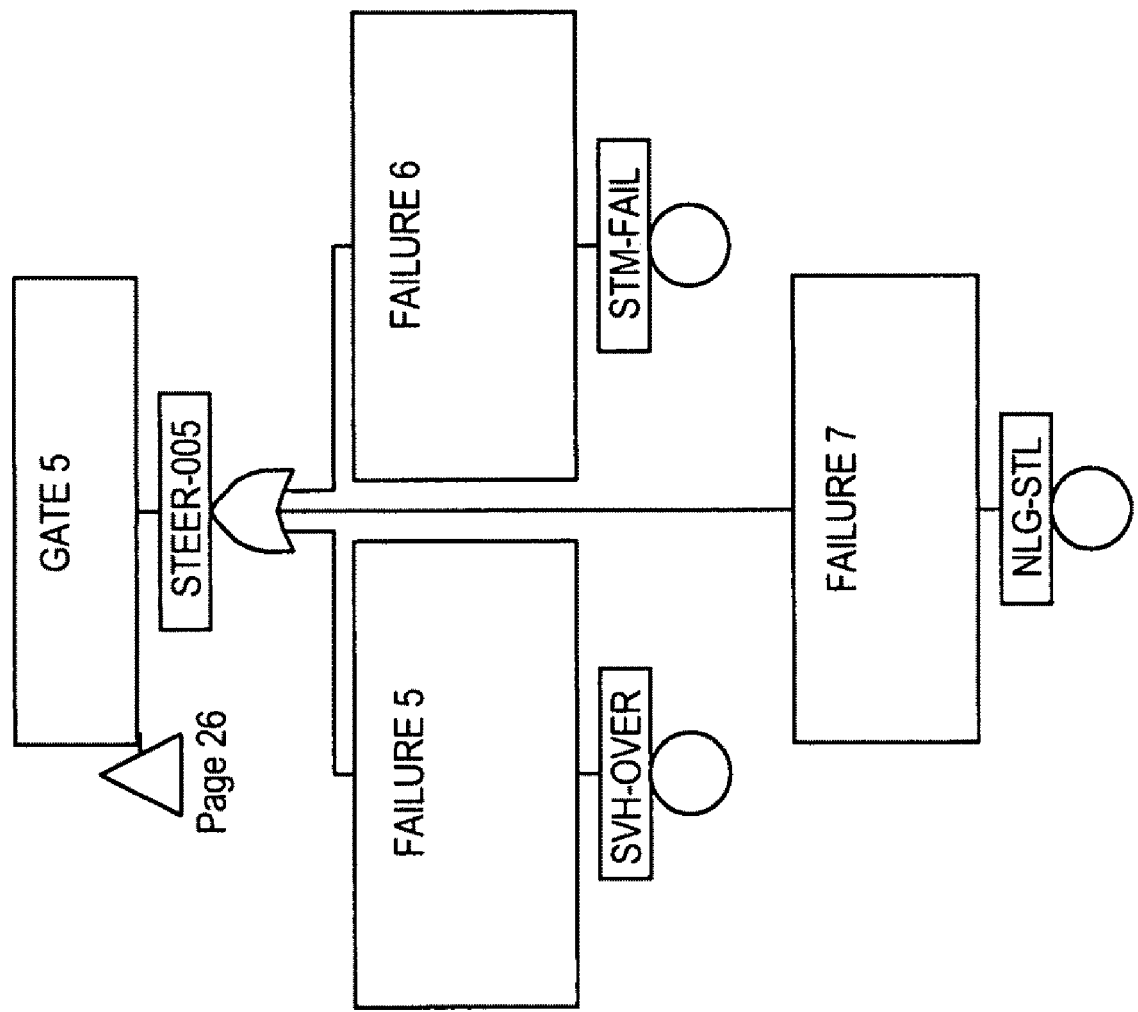
Figure 1A:
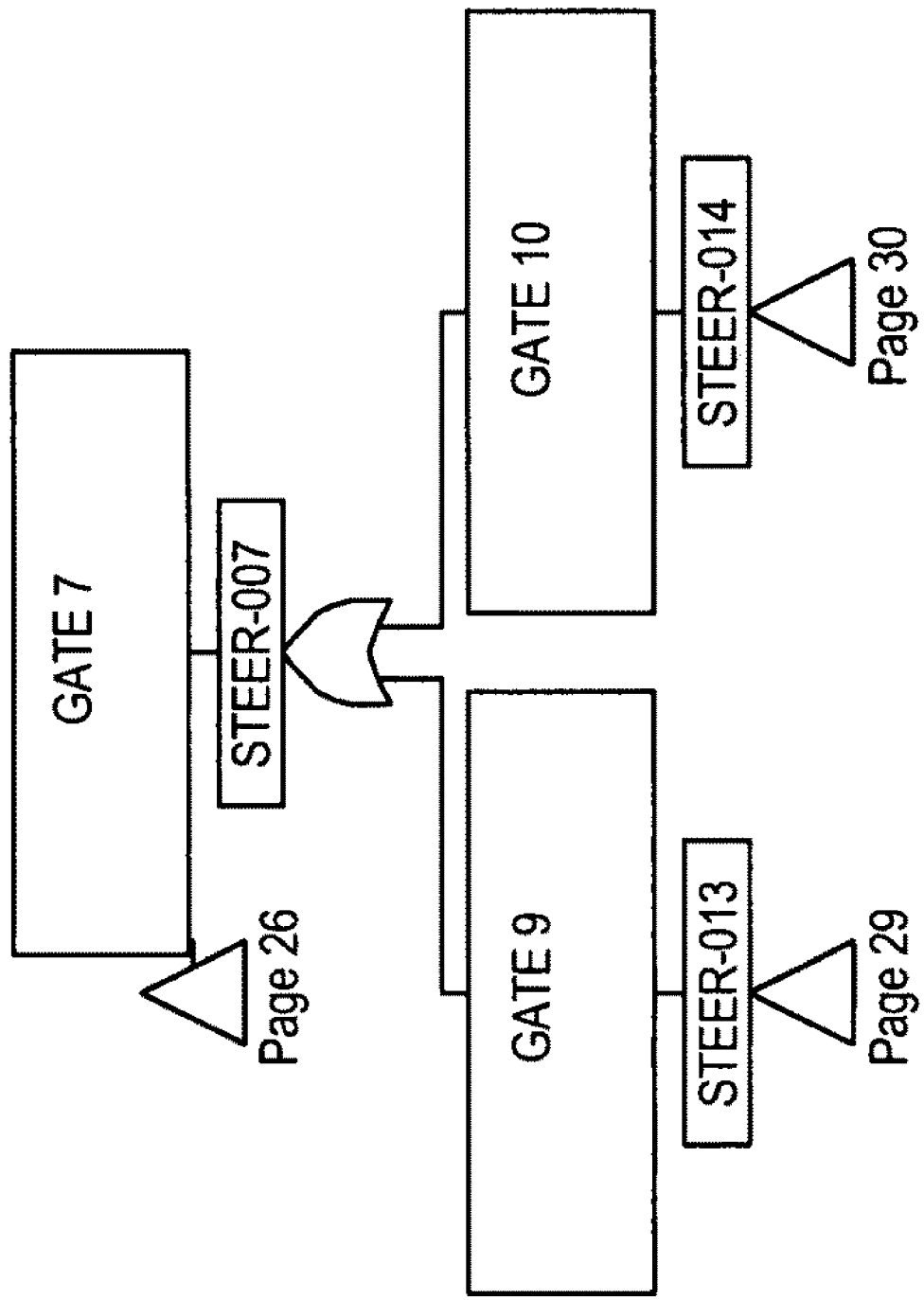
Figure 1A:
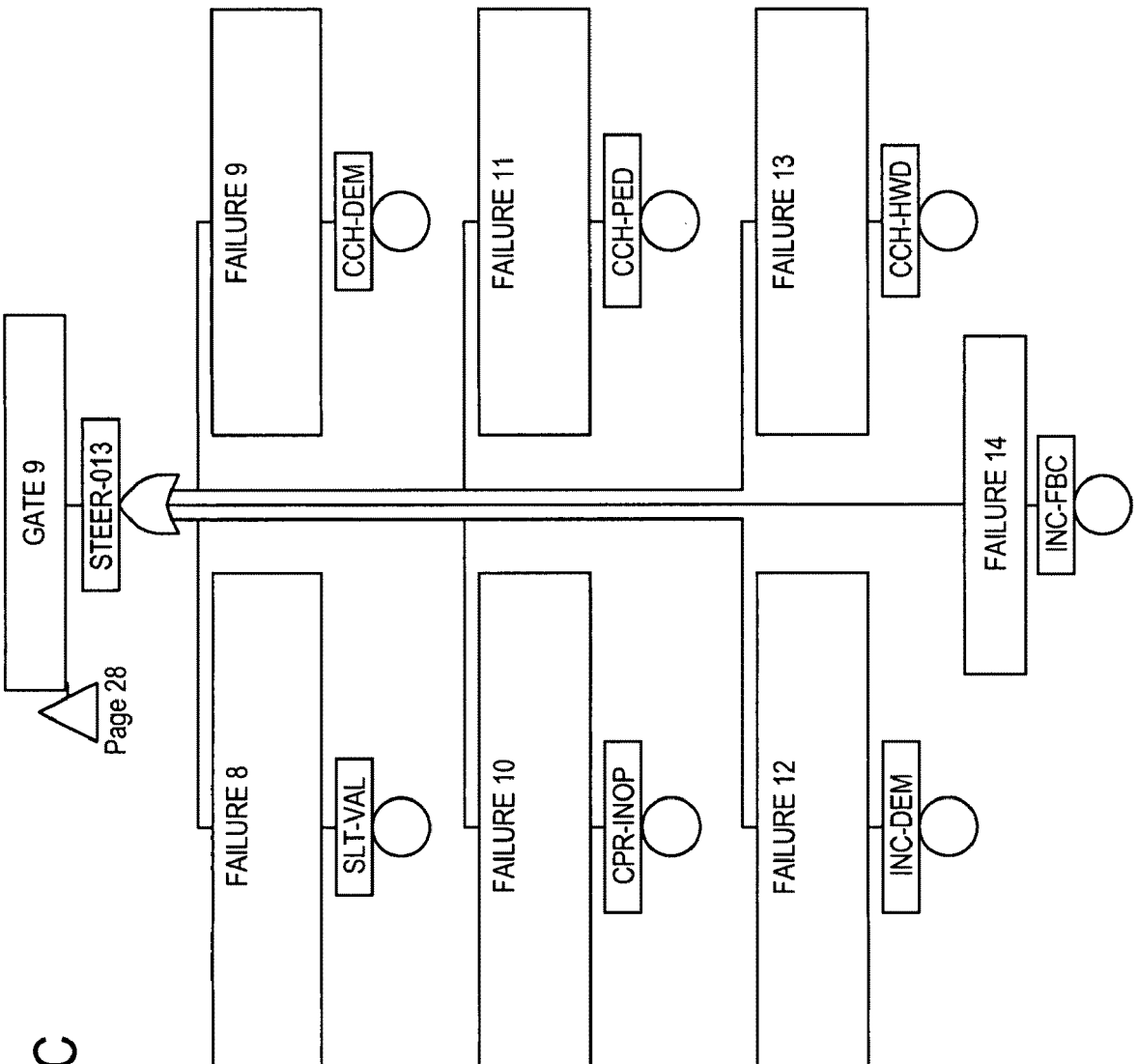
Figure 1A:
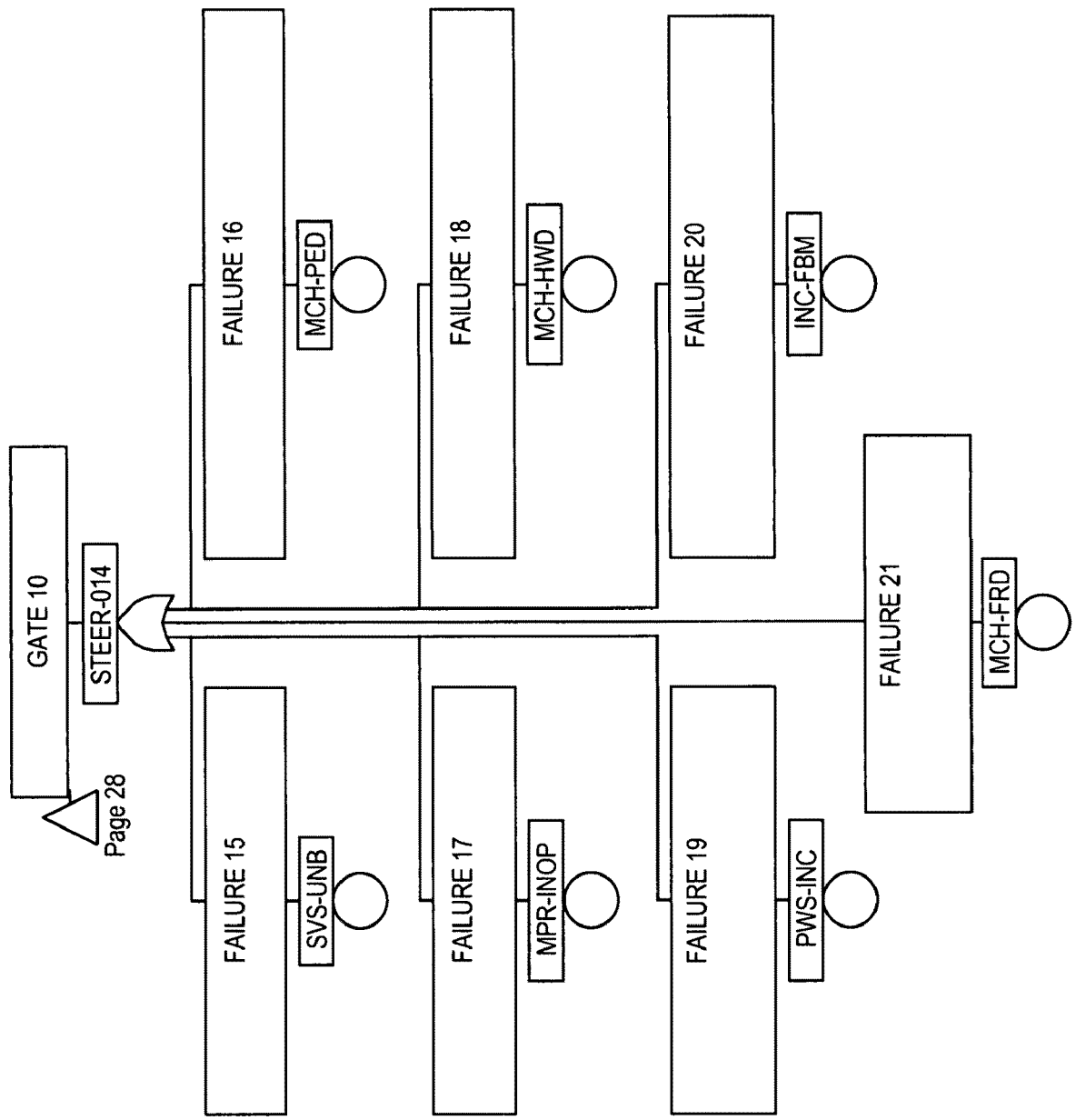
Figure 1A:
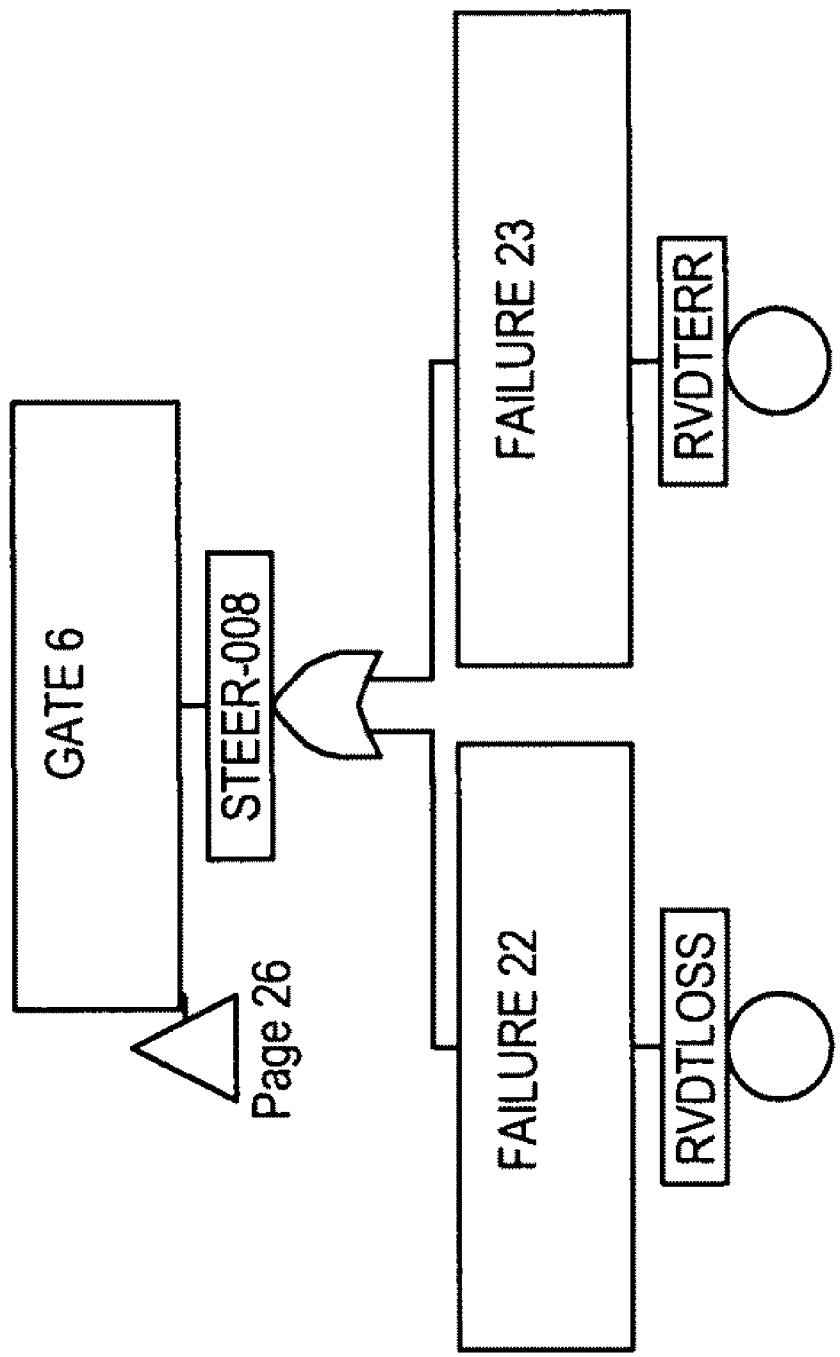
Figure 1A:
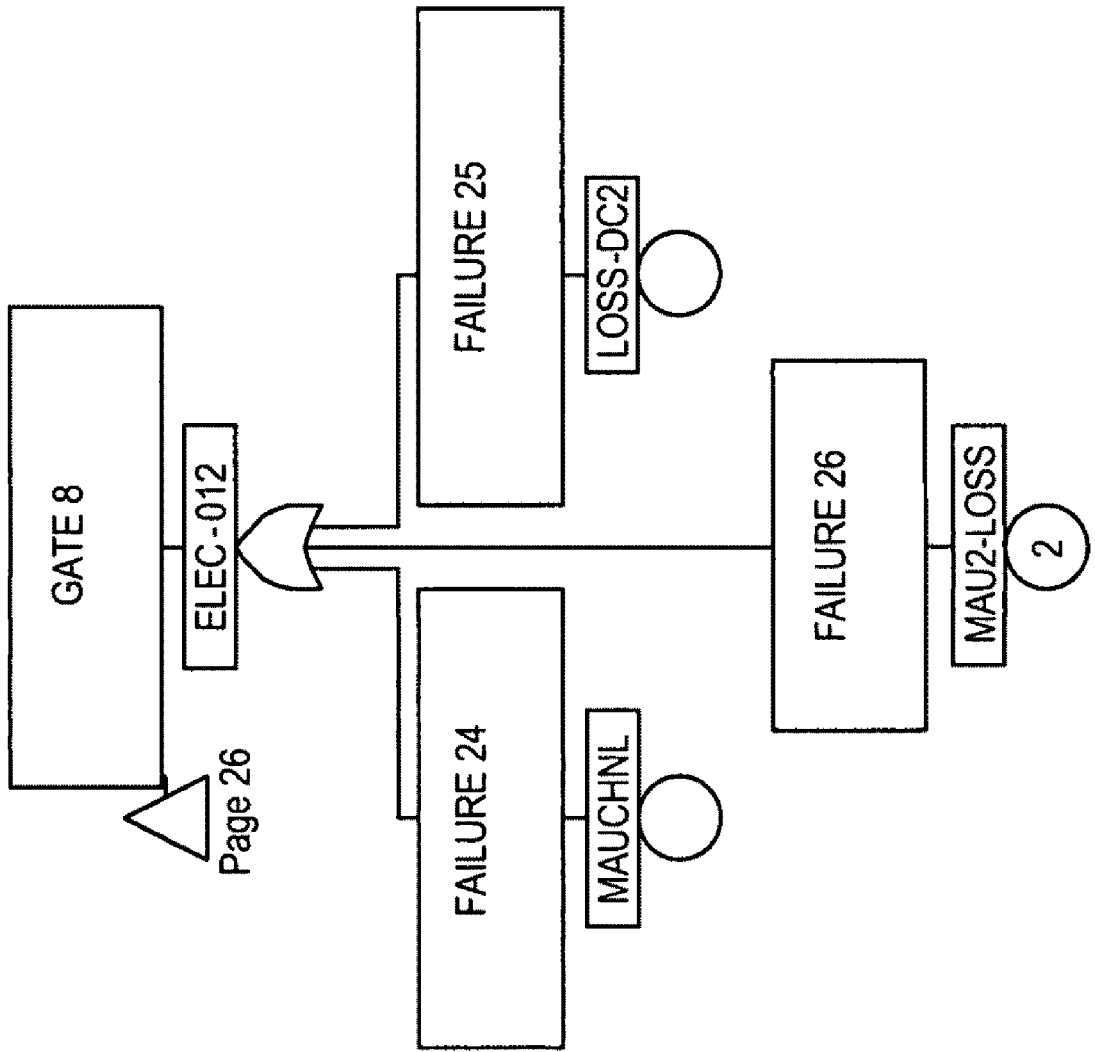

Applying the symbol key shown in FIGS. 2A-2B allows one to immediately understand the exemplary illustrative Fault Tree map shown in FIGS. 3A-3B. For example, at the top of FIG. 3A, the bolded triangle labeled "1" represents a top event. The diagram shows that this Top Event is contributed to by a node (logical Gate OR), coded 324, that is located on the page 1 of the underlying Fault Tree (see FIG. 1A) and by other node (logical Gate OR), coded 001, that is located on the page 26 of the underlying Fault Tree (see FIG. 1Z). This one is contributed to by a number of additional Failure nodes (logical Gates OR), with own codes. These logical Gates are located on the pages 27, 28, 31, 32, 29 and 30 of the Fault Tree. The shaded circles shown in FIG. 3A correspond to differently color coded cut sets. One can also see a repeated event "2" in FIG. 3A indicated by a bolded trapezoid. This repeated event can also be seen on the lower lefthand corner of the FIG. 3B fault tree map—indicating that the event (if a failure) contributes to both loss of wheel braking and loss of active steering. A reliability engineer is thus immediately alerted to the fact that this repeated event can reduce the fault tolerance of the overall system by contributing to two different aspects of the ANDed together failure modes.

While it is possible to manually generate a fault tree map of the type shown in FIGS. 3A-3B from the FIG. 1A-1AE fault tree, one exemplary illustrative non-limiting implementation prefers a computer generation process for efficiency and error avoidance. FIG. 4 is a block diagram showing an exemplary illustrative non-limiting Fault Tree Map computer generation process. As shown in FIG. 4, a user may input a fault tree using a conventional user input system 102 such as a keyboard, a mouse, etc. A computer 104 receives these inputs and processes them to generate a fault tree map which it may then display on a display monitor 114 and/or print using a printer 112 (or otherwise render or store). The exemplary illustrative non-limiting implementation uses fault tree creation software 106 of conventional design to create a fault tree. The fault tree may be stored in a conventional data storage/retrieval device 108. Fault tree map generation software 110 is used in the exemplary illustrative non-limiting implementation to generate a fault tree map.

FIG. 5 shows an exemplary flowchart of fault tree map generation, while FIG. 6 shows an exemplary flowchart of fault database transformation. Referring to FIG. 5, fault tree data input is received (block 150) and stored into a Fault Tree data base (blocks 152, 154). If the inputted data is associated with fault tree logic (block 156), the fault tree map structure is determined (block 158) and the map is constructed (block 160). If the inputted data is not associated with fault tree logic ("no" exit to decision block 156), then it is determined whether the inputted data is associated with an event (block 162). If so, ("yes" exit to decision block 162), then it is determined whether the event exposure time is equal to the mission time (block 164) or is more than the mission time (block 166). The results of these tests determine whether the event is an evident event or a latent event (i.e., an event with exposure time more than flight or mission duration) (blocks 168, 170).

Further testing is performed to determined whether a particular input relates to a gate (decision block 172). If the inputted data does relate to a gate ("yes" exit to decision block 172), then it is determined whether the event is an OR gate or an AND gate (block 174). These gates are rendered appropriately into the database transformation for the fault tree map (blocks 176, 178).

If the inputted data is associated with a fault tree evaluation (decision block 180), then this evaluation data is included in the fault tree map (block 182). If the inputted data is associated with a fault tree report (block 184), then this information may be used to encode page number on a fault tree map report gate (block 186).

If no more information is needed to represent the fault tree map (block 188), then the fault tree map may be displayed (block 190) and/or printed (block 192).

FIG. 6 shows an exemplary illustrative non-limiting transformation between a fault tree database 196 and a fault tree map database 198 that the FIG. 5 algorithm may effect. FIG. 6 shows for example how a fault tree logic database 202 may be transformed into a fault tree map structure 302. A fault tree event database 204 may be transformed to an event type map symbol 304 and an event code 305 as shown. A fault tree gates database 206 may be transformed to a gate type map symbol 306 and a gate code 307 as shown. A fault tree evaluation database 208 may be transformed to repeated events (special markings), cutset utensils (special marking), repeated gates (special marking) and/or event importance (special marking) 308*a-d* as shown. A fault tree report database 210 may be transformed to a gate page number 310 in the manner shown.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A method of generating a graphical presentation of a fault tree map for use in technical system or installation design and/or diagnostics, said method comprising:
   (a) creating a fault tree including cut sets and events important evaluation;
   (b) analyzing the fault tree to determine latent failures, repeated events and gates;
   (c) generating, with a computer, a compact map of said fault tree, said compact map graphically indicating evident event (failure) type with a first connector symbol and indicating events with exposure time in excess of flight duration (mission time) with a second connector symbol different from said first connector symbol; graphically indicating logic gates with predetermined symbols different from Fault Tree gates image; and
   (d) graphically presenting said compact fault tree map.

2. The method of claim 1 wherein said graphically presenting comprises repeated events and repeated gates with predetermined symbols/colors.

3. The method of claim 1 further including indicating different cut sets with different colors and more important event with predetermined symbols.

4. The method of claim 1 wherein said graphically presenting comprises displaying said compact fault tree map on an electronic display.

5. The method of claim 4 further suppressing from said map, display of word-based events (failures) and gates descriptions.

6. The method of claim 1 further including failure propagation demonstration by color indicating of the propagation path.

7. The method of claim 1 further including numbers of Fault Tree report pages where gates are placed.

8. The method as claimed in claim 1, further including performing fault analysis in production installation.

9. The method as claimed in claim 1, further including performing fault analysis in specific production installation.

10. The method as claimed in claim 1, further including performing fault analysis in technical system/equipment (Hardware).

11. The method as claimed in claim 1, further including performing fault analysis in integrated Hardware/Software technical system.

12. A method for Fault Tree Map generation, with a computer, for a technical system or installation, using as basis the technical system/equipment or installation Fault Tree diagram and comprising: substitution of the all logical Gates by adequate symbols, which graphically define the Gate type and content the Gate identification Code; exclusion of the Gate description; when on the report generation stage, inclusion the numbers of pages, where the logical Gate is placed; substitution of the all evident failures by adequate symbols, which graphically define the failure type; substitution of the all latent failures by adequate symbols (different than evident failure symbols), which graphically define the failure type; substitution of the other types of failures by adequate different symbols, which graphically define the failure types; exclusion of the all evident/latent/other failures description, that permits drastically compact the conventional Fault Tree depiction and facilitates performing of the Fault Tree qualitative analysis including evaluation of combination of latent failures and evident failures, and failure propagation potentiality, besides facility of localization of each Fault Tree logical Gate and relevant failures in the fault tree printed report.

13. The method as claimed in claim 12, further including using computerized means to transform the conventional Fault Tree to a Fault Tree Map.

14. The method as claimed in claim 13, further including using computerized means to automatic indication the relevant information on the Fault Tree Map.

15. The method as claimed in claim 12, further including performing fault analysis in production installation.

16. The method as claimed in claim 12, further including performing fault analysis in specific production installation.

17. The method as claimed in claim 12, further including performing fault analysis in technical system/equipment (Hardware).

18. The method as claimed in claim 12, further including performing fault analysis in integrated Hardware/Software technical system.

19. The method as claimed in claim 12, which further comprises repeated failures and repeated Gates indication, indication of failures utensils to determined Cut Set and indication of the failure importance evaluation results, using special marking, that provide the repeated events consideration and adequate Fault Tree treatment to avoid mistakes; the mitigation means to decrease the importance failure impact to object efficiency and safety.

20. A method of processing a fault tree comprising:
   (a) analyzing the fault tree to determine latent failures and repeated events;
   (b) automatically, with a computer, generating a map of said fault tree, said map graphically indicating evident event type with a first connector symbol and indicating events with exposure time in excess of a predetermined duration with a second connector symbol different from said first connector symbol; and
   (c) graphically presenting said map.

* * * * *